(12) United States Patent
Baur et al.

(10) Patent No.: US 12,338,872 B2
(45) Date of Patent: Jun. 24, 2025

(54) FLEXIBLE MULTI-MATERIAL STRUCTURES

(71) Applicant: Government of the United States, as represented by the Secretary of the Air Force, Wright-Patterson AFB, OH (US)

(72) Inventors: Jeffery Baur, Liberty Township, OH (US); David Seifert, Beavercreek, OH (US); Geoffrey Frank, Dayton, OH (US); Patrick Walgren, Anchorage, AK (US); Darren Hartl, College Station, OH (US); Wesley Chapkin, Fairborn, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 511 days.

(21) Appl. No.: 17/929,763

(22) Filed: Sep. 6, 2022

(65) Prior Publication Data
US 2023/0279916 A1    Sep. 7, 2023

Related U.S. Application Data

(63) Continuation-in-part of application No. 17/373,101, filed on Jul. 12, 2021, now Pat. No. 12,123,470.
(Continued)

(51) Int. Cl.
*F16F 3/02* (2006.01)
*A61B 17/00* (2006.01)
*F16F 1/06* (2006.01)

(52) U.S. Cl.
CPC ............ *F16F 3/02* (2013.01); *F16F 2236/02* (2013.01)

(58) Field of Classification Search
CPC ..... A61B 17/00; A61B 34/30; A61B 1/00149; F16F 3/02; F16F 2236/02; F16F 1/3605;
(Continued)

(56) References Cited

U.S. PATENT DOCUMENTS

| 3,231,256 A | 1/1966 | Olson |
| 4,708,757 A | 11/1987 | Guthrie |

(Continued)

*Primary Examiner* — Thomas W Irvin
(74) *Attorney, Agent, or Firm* — AFMCLO/JAZ

(57) ABSTRACT

A flexible multi-material structure comprises a plurality of overlapping rings that form a generally circular shape perpendicular to a longitudinal axis of the structure; an internal compliant hollow frame having a circumference corresponding to the generally circular shape of the plurality of rings, the internal frame comprising: a plurality of connection clips wherein each connection clip is attached one of the plurality of rings, the internal frame and connection clips defining a longitudinal spacing between the plurality of rings, each of the plurality of rings is shaped to minimize contact with adjacent rings when the structure is articulated, each ring including a spherical profile along an aft interior region which nests with a forward outer region of an adjacent ring, wherein connections between the rings and the frame allows independent motion of the rings and frame, allowing each ring to pivot about a geometric center of the spherical profile.

6 Claims, 33 Drawing Sheets
(28 of 33 Drawing Sheet(s) Filed in Color)

Related U.S. Application Data

(60) Provisional application No. 63/051,928, filed on Jul. 15, 2020.

(58) Field of Classification Search
CPC .... F16F 1/34; F16F 1/028; F16F 1/046; F16F 1/06
See application file for complete search history.

(56) References Cited

U.S. PATENT DOCUMENTS

| | | | |
|---|---|---|---|
| 6,669,184 B2 | 12/2003 | Cai et al. | |
| 7,564,175 B2 * | 7/2009 | Stier | F02M 51/0603 |
| | | | 310/311 |
| 8,446,073 B2 | 5/2013 | Uhlmann et al. | |
| 8,454,290 B2 | 6/2013 | Schaser et al. | |
| 8,466,397 B1 | 6/2013 | Teter et al. | |
| 8,540,224 B2 | 9/2013 | Guthrie | |
| 9,416,839 B2 * | 8/2016 | Ma | F16F 7/121 |
| 10,550,906 B2 * | 2/2020 | Kober | F16F 1/028 |
| 10,624,530 B2 * | 4/2020 | Graham | A01K 85/005 |
| 11,576,740 B2 * | 2/2023 | Kurokawa | A61B 17/29 |
| 11,850,015 B2 * | 12/2023 | Chen | A61B 34/70 |
| 12,092,181 B2 * | 9/2024 | Barthelme | F16C 33/586 |
| 12,123,470 B1 * | 10/2024 | Baur | F16F 1/3605 |
| 12,150,631 B2 * | 11/2024 | Cohen | A61B 17/00234 |
| 2004/0138700 A1 | 7/2004 | Cooper et al. | |
| 2006/0113870 A1 * | 6/2006 | Kienzler | F02M 47/027 |
| | | | 310/328 |
| 2013/0096887 A1 | 4/2013 | Fee et al. | |
| 2014/0017422 A1 | 1/2014 | Ma | |
| 2021/0177529 A1 | 6/2021 | Liu et al. | |

* cited by examiner

130

FLEXIBLE MULTI-MATERIAL STRUCTURES

Pursuant to 37 C.F.R. § 1.78(a)(4), this application claims the benefit of and priority to prior filed co-pending Non-Provisional application Ser. No. 17/373,101, filed 12 Jul. 2021, Provisional Application Ser. No. 63/051,928, filed 15 Jul. 2021, and Provisional Application Ser. No. 63/241,559, filed 8 Sep. 2021, each of which are expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to flexible structures and, more particularly, to flexible multi-material structures that have asymmetric global stiffness properties.

BACKGROUND OF THE INVENTION

Structures that are able to obtain asymmetric global stiffness properties (i.e. a cylinder that is compliant in bending but radially stiff) via architected multi-material substructures have applications in many fields, including medical and aerospace industries. Design of such structures requires careful tailoring of material properties and substructure topology to arrive at optimal performance within tightly constrained design spaces. It is often the case that these structures must survive large global displacements, maintain a smooth outer surface, and provide sufficient mechanical rigidity, e.g. radial rigidity. While myriad solutions exist for flexible, non-load bearing or lightly-loaded joints and for cylindrical structural columns, a monolithic design often falls short of satisfying both objectives. What is desired is a structure composed of multiple materials and/or architected substructures that is able to withstand and transfer loads under changing configurations.

SUMMARY OF THE INVENTION

The present invention overcomes the foregoing problems and other shortcomings, drawbacks, and challenges of flexible, non-load bearing joints and cylindrical structural columns. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a flexible multi-material structure comprises a spring skeleton comprising a plurality of repeating cells, the cells filled with an infill material, wherein the spring skeleton is one of a machined spring structure or a wave spring structure.

According to a first variation, the spring skeleton may comprise one of metallic or stiff polymeric blends. Metallic structures may consist of steel, aluminum, or titanium. Polymeric blends may consist of one or more of polycarbonate, polyetherimide, or polyether ether ketone blends. The infill material may consist of one or more of foamed and monolithic elastomers. The foamed and monolithic elastomers may consist of one or more of silicones, polyether, and polyurethane.

According to a further variation, the Poisson ratio of the infill material range between 0.1 to 0.4.

According to another variation, the repeating cells of the spring skeleton have a predetermined wall thickness (t), wall height (h), and revolution symmetry.

According to another embodiment of the invention, a flexible multi-material structure comprising a plurality of overlapping rings that form a generally circular shape perpendicular to a longitudinal axis of the structure; an internal compliant hollow frame having a circumference corresponding to the generally circular shape of the plurality of overlapping rings, the internal compliant frame comprising: a plurality of connection clips wherein each connection clip is attached one of the plurality of overlapping rings, the internal compliant frame and connection clips defining a longitudinal spacing between the plurality of overlapping rings, each of the plurality of rings is shaped to minimize contact with adjacent rings when the structure is articulated, each ring including a spherical profile along an aft interior region which nests with a forward outer region of an adjacent ring, wherein connections between the rings and the compliant frame allows independent motion of the rings and compliant frame, allowing each ring to pivot about a geometric center of the spherical profile.

According to a first variation of this embodiment, the compliant frame comprises continuous helical paths to impart torsional rigidity to resist torsion motion.

According to another variation of this embodiment, the continuous helical paths of the compliant frame comprise at least one left-handed helical path and at least one right-handed helical path which form intersections every 90 degrees or less around the circumference of the compliant frame.

According to a further variation of this embodiment, the connection clips are fixed to the compliant frame at the intersections in the continuous circumferential paths.

The rings may be formed from any classes of materials with sufficient structural rigidity to resist deformation due to pressure loads, including metals and carbon matrix composites. The rings are shaped to minimize contact when the neck is articulated, forming a spherical profile along part of the interior region of each ring.

For elevated temperature applications carbon matrix composites may be used to form rings that can survive extended exposure at 850° C. The compliant frame may be formed from any of several classes of materials, including structural plastics and metals, that have sufficient elongation to preclude damage when the skin is articulated over its full range of motion.

Connections between rings and compliant mechanism allow independent motion of the rings and compliant mechanism, allowing each ring to pivot about the center of the spherical profile. The compliant frame forms continuous circumferential paths to impart torsional rigidity to resist torsion motion.

According to a further embodiment of the invention, a flexible multi-material structure comprises a plurality of rings of overlapping scales that form a generally circular shape perpendicular to a longitudinal axis of the structure; an internal compliant hollow frame to which the plurality of rings of overlapping scales is attached, the internal compliant hollow frame comprising: a circumference corresponding to the generally circular shape of the plurality of rings of overlapping scales; at least one continuous left-handed helical path and at least one continuous right-handed helical path which form intersections every 90 degrees or less around the circumference of the compliant frame; a plurality of circumferential rings to which a forward edge of each of the plurality of scales are fixed to form uniform rings of scales around the circumference, the circumferential rings passing through the intersections of the right-and left-handed helical paths, the pitch of the left- and right-handed helical paths coinciding with the spacing of circumferential rings of the internal compliant frame and defining intersection spacing that provides overlap between adjacent rows of scales.

According to a first variation of this embodiment, each row of scales is offset by half of a scale width. This provides some protection to the underlying rows of scales.

The structure comprises a set of scales/plates that overlap in the axial/longitudinal direction which are connected to an internal reinforcing frame that maintains the spacing and alignment of the scales/plates.

The plates may be formed from any classes of materials with sufficient structural rigidity to resist deformation due to pressure loads, including metals and carbon matrix composites. The plates may be flat or curved to match the circumferential shape of the neck. Gaps between each plate in the circumferential direction allow each plate to move independently when the neck is articulated.

Sequential rows of plates in the axial direction are overlapped sufficiently that the sequential rows remain overlapped throughout the range of motion of the neck.

For elevated temperature applications carbon matrix composites may be used to form rings that can survive extended exposure at 850° C.

The reinforcing frame may be formed from any of several classes of materials, including structural plastics and metals, that have sufficient elongation to preclude damage when the skin is articulated over its full range of motion. Stiff/rigid connections between the plates and reinforcing frame prevents the plates from moving independently of the frame. The reinforcing frame forms continuous circumferential paths to impart torsional rigidity to resist torsion motion.

The features described above and in the following description may be combined in any conceivable manner in order to achieve desired performance characteristics.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

Figure 1A:
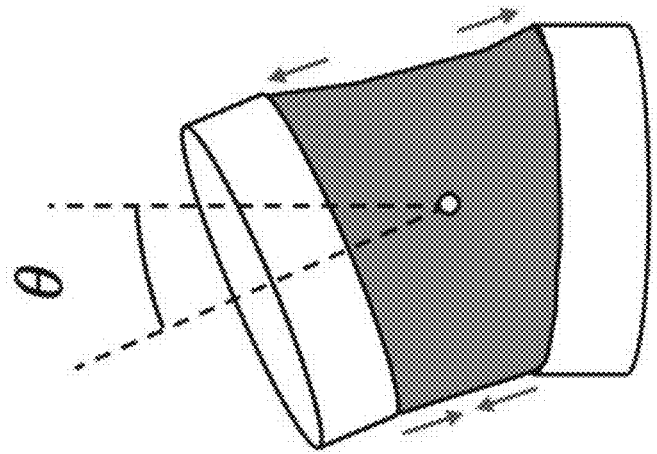
FIG. 1A illustrates a schematic of a morphing cylinder with representational forces acting on the bending region (center section).

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration. The terms "about" and "approximate" are understood to indicate +/−10%, +/−10° C., or +/−5 angular degrees of the stated value. Each embodiment illustrated and described herein includes a number of features which may be combined in any manner to achieve the desired performance characteristics.

DETAILED DESCRIPTION OF THE INVENTION

Experiments have shown that if the nose of a missile is physically bent or flexed to point more towards its target, then this greatly increases the accuracy of the missile in hitting the target. The invention disclosed herein provides a generally cylindrical-shaped structure with a morphing skin that is capable of handling the torsional and bending stresses that may be encountered by such a flexible missile, or other devices.

Previous efforts in the area of morphing skins have focused on the folding, shear, rotation, or extension of wings. This disclosure specifically investigates the formation of optimal designs for composite cylinders that balance the out-of-plane rigidity needed to resist aerodynamic loads, along with the work needed to articulate the cylinder 25 degrees or more in any direction while maintaining a smooth outer mold line.

The disclosed technique can readily provide thousands of designs, i.e. structural arrangements, which may embody dozens of archetypes. The process may apply bio-inspiration, topology optimization, and finite element analysis methods to arrive at a set of non-dominated designs that span a range of radial rigidity values and bending (articulation) values. To validate the modeled results, various archetypes were fabricated and characterized.

It was found that the archetypes show strong agreement between model predictions and measured responses on the archetypes. As part of the optimization process, graphical material selection methods were used to identify the top performing material classes from a database. The process then used previously printed composites, embedded actuation, and shape memory polymers for further optimization of the most promising structures. Overall, the process provided a multitude of design variations which may be optimized and tested for application and use on different structural and performance problems.

Morphing of cylindrical fuselage sections offers new opportunities and challenges for aerospace structures. Composite morphing skins comprising both high modulus and low modulus materials may be required to enable the desired large articulation. Dozens of archetypes and thousands of structures were examined, including embedded reinforced elastomers, overwrapped skeleton structures, and topology optimized structures. The filled wave spring archetype appears to have a promising balance of torsional and radial stiffness with acceptable bending stiffness. We then optimized the dimensions of the archetype design depending on the properties of the materials selected.

We explored the trade-offs between aerodynamic performance and actuation efficiency with respect to shape-changing aerospace structures. Herein, a morphing cylinder is optimized to minimize both its work to actuate in bending as well as radial deviations. Based on derived linear elastic mechanics of a cylindrical shell in bending, it was determined that favorable designs have high circumferential and low axial stiffnesses. We investigated circumferentially-reinforced composites comprising rigid and elastomeric materials that limit radial displacement yet allow for out-of-plane bending. Designs of flexible elastomeric skins with embedded or underlying reinforcement were modeled, fabricated, and compared to unreinforced skins. Finite element analyses were used to predict the bending kinematics and structural responses. Digital image correlation was used during bending of physical prototypes to generate strain contour plots of cylinder surfaces. Strong agreement between model predictions and experimental measurements was observed. The dimensions of each archetype were systematically varied via finite element modeling to obtain a set of non-dominated designs capable of 25° of bending without buckling or large radial displacements. It was determined that flexible skins reinforced with embedded rings were optimal at low (8-15 Nm) and high (>250 Nm) values for the work to articulate, and flexible skins reinforced with underlying helical springs were optimal at moderate values (15-250 Nm).

The disclosed morphing structures for aerospace and other applications explore the trade-offs between the complexity, cost, weight, and energy needed to activate a shape-changing system with the anticipated benefits in vehicle agility and range. Morphing skins are important components of these systems. Their primary functions are to accommodate the structural shape change while maintaining a desirable outer mold line with sufficient structural integrity to withstand aerodynamic loads. Depending on the application, successful shape-changing skin designs can exhibit directional and/or temporal differences in stiffness.

Stiffness may be engineered to provide the appropriate rigidity in the desired direction in order to minimize unwanted structural deviations under aerodynamically loading. The compliance of the structure in a different direction at a specific time may minimize the total actuation energy needed to effect the shape change. The integration of these aspects into a single structure, with the appropriate design and materials, is a key challenge to the effective function of a morphing skin. A successful design also depends significantly on the type of shape change (bending, expansion, contraction, etc.) required for the intended application.

Figure 1B:
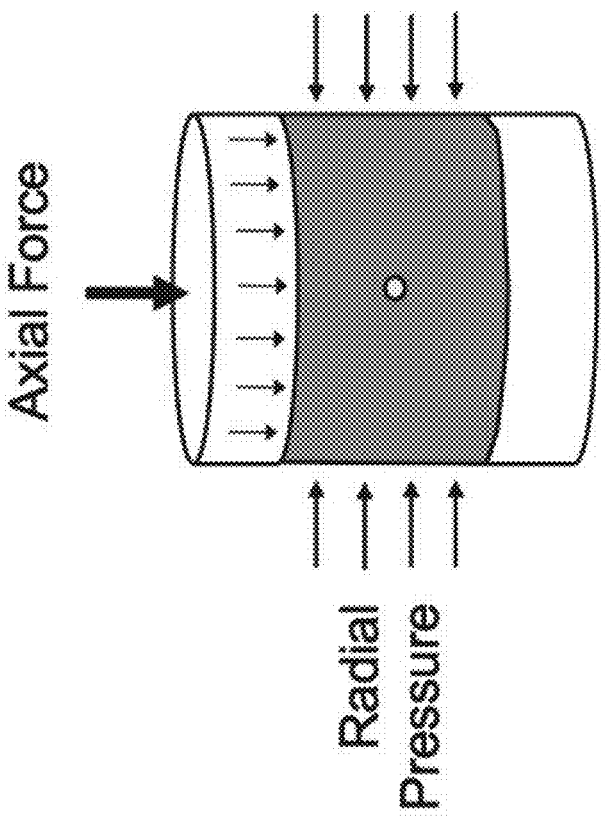
FIG. 1B illustrates that the bending region of FIG. 1A undergoes simultaneous tension and compression during articulation, as indicated by the arrows.
Figure 2:
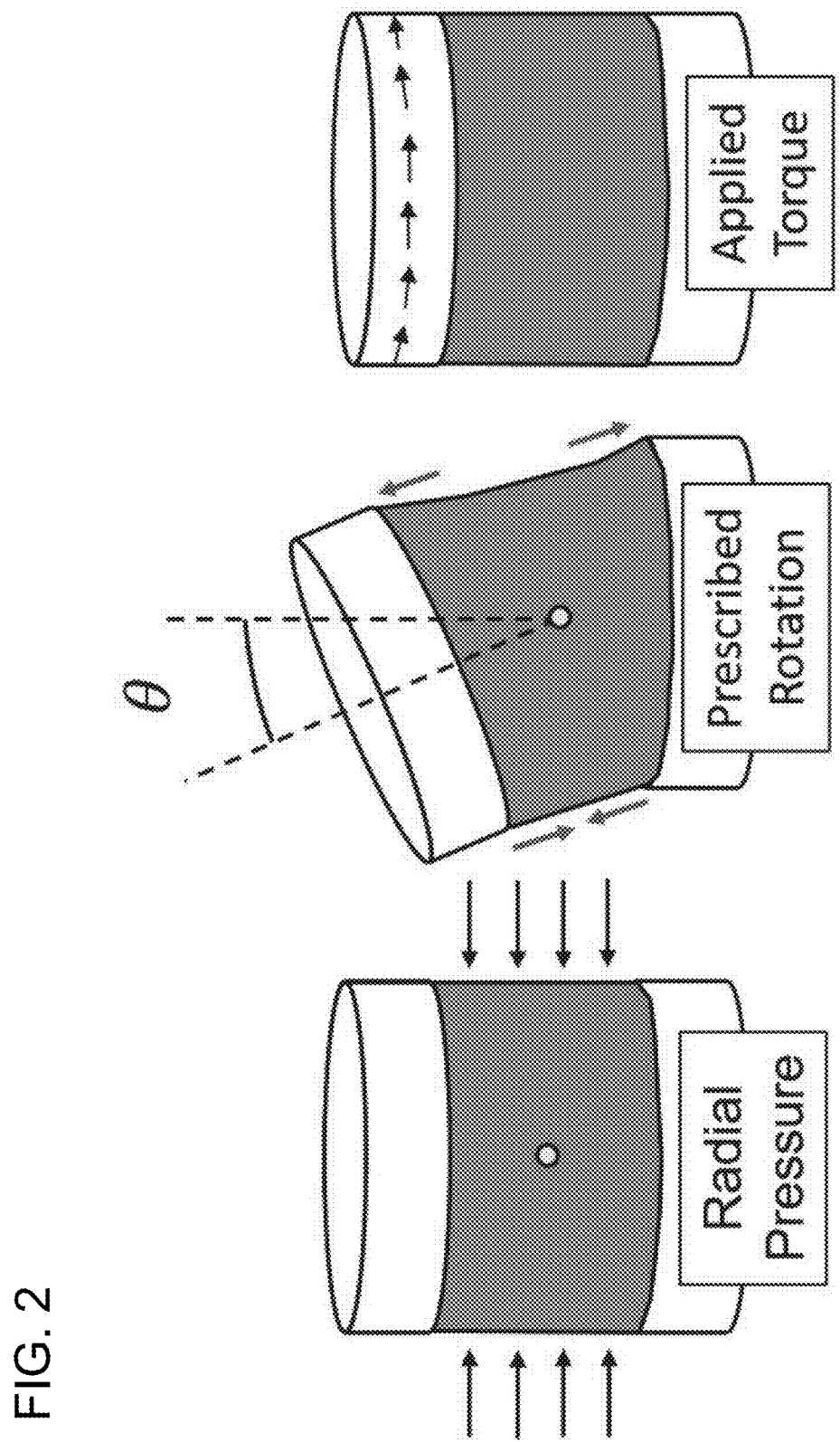
FIG. 2 illustrates applied load cases with optimization design space depicted in gray.
Figure 3A:
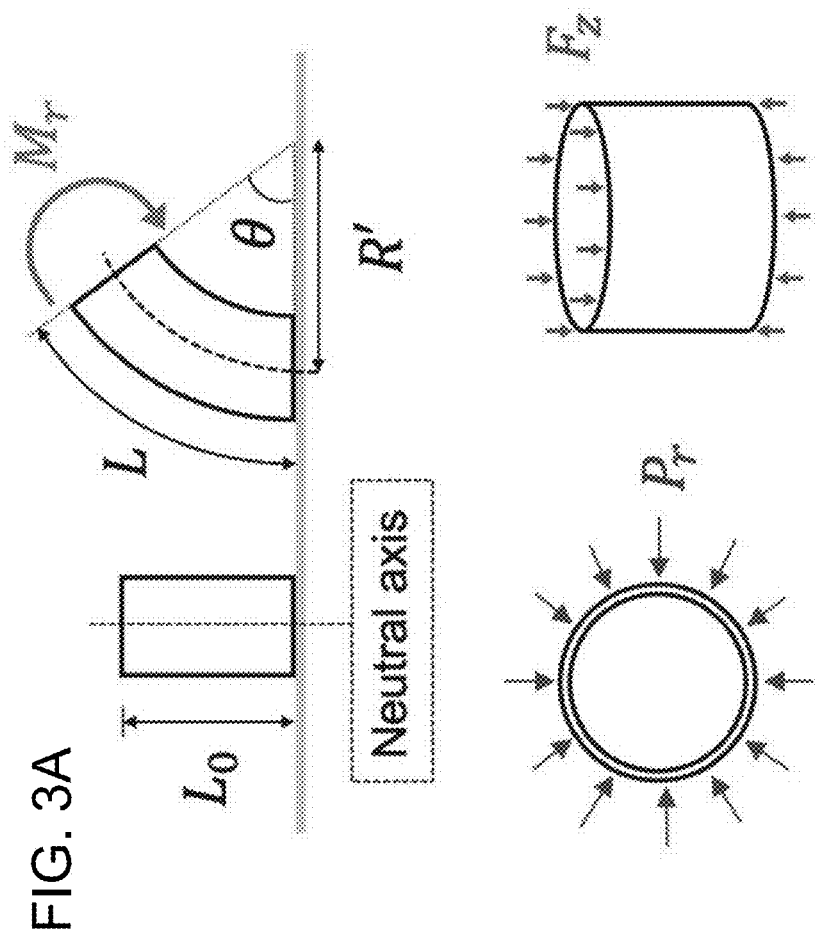
FIG. 3A illustrates large-scale deformation from bending a cylindrical shell with an imposed moment $M_r$, while maintaining shape against an axial load $F_z$ and radial pressure $P_r$.
Figure 3B:
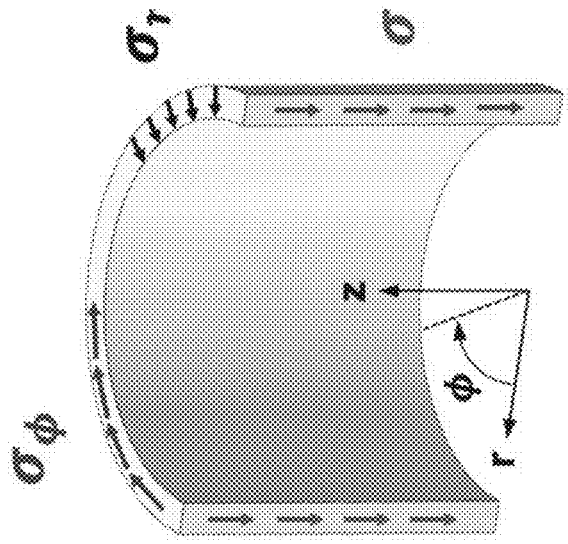
FIG. 3B illustrates that the applied external forces result in radial, hoop, and axial stresses ($\sigma_r$, $\sigma_\phi$, $\sigma_z$) in the shell wall.

Drawing inspiration from nature, morphing wings are the most widely demonstrated example. However, as aerospace structures evolve in complexity, other less-investigated geometries may also warrant examination. One such example includes aerospace structures with ellipsoidal, e.g., cylindrical, cross-sections such as aircraft fuselages, spacecraft struts, or boom shafts. Applying axial bending to this geometry results in an underexplored shape-changing aerospace structure: a morphing cylinder (see FIGS. 1A-1B). FIG. 2 presents three applied load cases, with the optimization space depicted in gray. FIG. 3A illustrates large-scale deformation from bending a cylindrical shell with an imposed moment $M_r$ while maintaining shape against an axial load $F_z$ and radial pressure $P_r$. FIG. 3B illustrates that the applied external forces result in radial, hoop, and axial stresses ($\sigma_r$, $\sigma_\varphi$, $\sigma_z$) in the shell wall.

A basic requisite for a morphing cylinder is the ability to pivot about a defined point with omni-directionally radial symmetry. Additionally, the structure must maintain a smooth outer mold line (OML) and exhibit sufficiently high circumferential stiffness to prevent significant displacement, i.e. <2.5 mm radial displacement due to aerodynamic loads. The use of low stiffness, high-strain materials and structures in the bending direction ensures that the actuation energy required to articulate the cylinder is minimized.

Although the work to actuate and the shape requirements are usually antithetical, one potential solution to avoid sacrificing the performance of one of the objectives is to utilize variable stiffness materials, i.e. single-materials or composites having rigidity that changes with time. The approach to deform cylinders in bending using variable stiffness materials has been studied previously for medical (viz., endoscopes) and soft robotics (viz., joints) applications. However, since variable stiffness approaches can increase the required energy to actuate the cylinder, the scope of the current study is limited to passive solutions.

The simplest example is a cylindrical shell composed of a high-strain, high-modulus elastomer. However, single-material solutions are generally infeasible for morphing applications. The maximum strains of higher modulus materials are typically exceeded in many morphing designs. Moreover, materials capable of higher elastic strains generally lack the stiffness values necessary to maintain an ideal aerodynamic shape under dynamic loading and/or bending. It therefore follows that—similar to past morphing wing designs—a hybrid solution composed of synergistic elements is an optimal path. These designs combine flexible outer skins that maintain a smooth, continuous outer surface with compliant, load-bearing skeletal structures that reinforce the skins, i.e. a filled skeleton, a stiffer skeleton filled with a less-stiff, high-strain material. With this approach, flexible areas reduce the work to actuate to high strains while underlying, overlapping, or embedded rigid layers carry the majority of the structural loads.

From a design optimization perspective, we seek to minimize the actuation energy involved in articulation while concurrently minimizing the radial shape displacement of the morphing cylinder. Leveraging results from finite element (FE) parametric studies, a variety of reinforced designs are considered, and the performance of each is quantified according to these parameters. Prototypes of the top performing designs were fabricated and physically tested to corroborate FE simulations. Using digital image correlation (DIC), strain maps were generated from bending tests to compare with the models (see FIGS. 4 and 5).

Materials and Methods

Finite Element Analysis (FEA)

FE models of different morphing cylinder designs were constructed and analyzed in Abaqus (v6.14, Dessault Systemes Simulia Corp.). A helical spring-reinforced elastomer was analyzed using Abaqus/Explicit. Six separate parts were modeled—an elastomeric outer skin, a helical spring, two clamping bands, and two test frame rings at the top and base. The six elements defined the overall morphing skin system. The analysis used an explicit solution to articulate the assembly. Kinetic energy remained sufficiently low compared to strain energy to provide a quasi-static solution. All parts were modeled as linearly elastic with first-order elements. The elastomeric outer skin was modeled with continuum shells, the steel clamping bands were modeled with standard shells, and the steel spring and aluminum test frame rings were modeled with hexahedral elements. A coefficient of friction of 0.5 was assumed between the spring and elastomer. Each test frame ring was coupled to a reference node for which motion was prescribed to control the articulation of the system.

Digital Image Correlation

Figure 4:
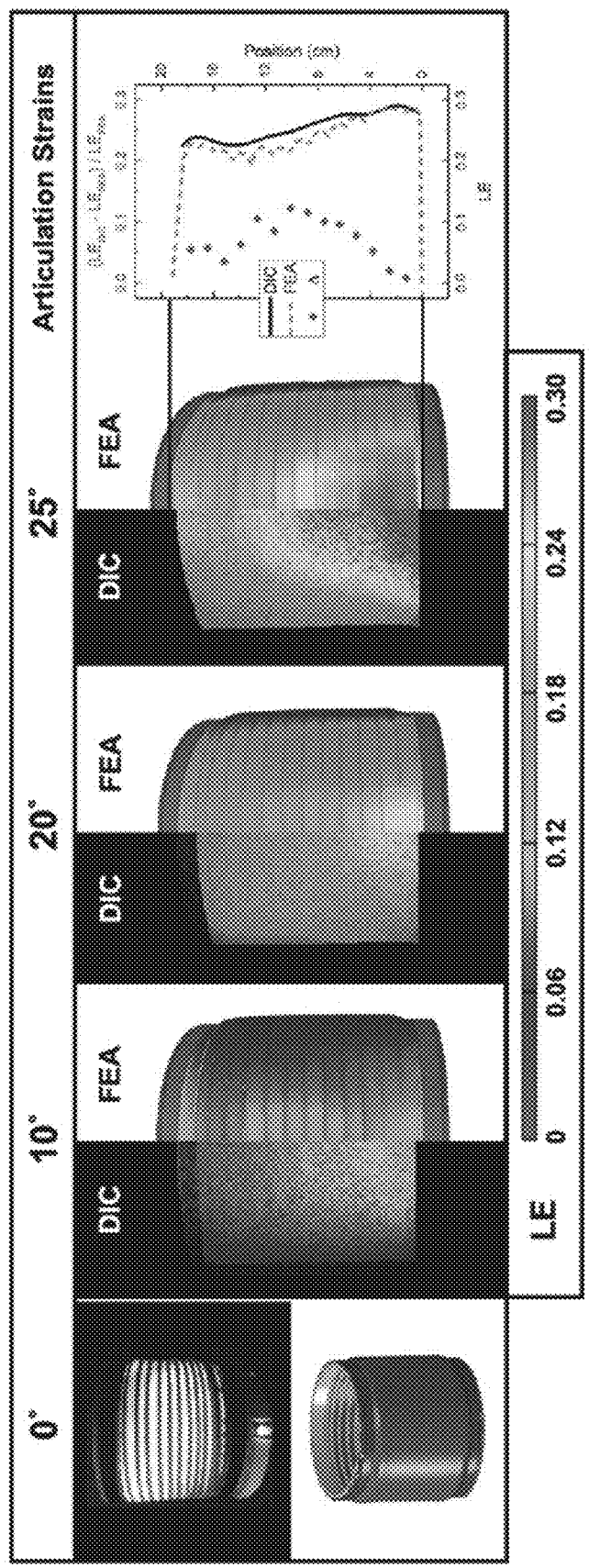
FIG. 4 presents strain maps for the tension side of helical spring-reinforced elastomeric skin having circumferential reinforcements and articulating to 25° as modeled by Finite Element Analysis (FEA) and experimentally measured by Digital Image Correlation (DIC).
Figures 5A, 5B:
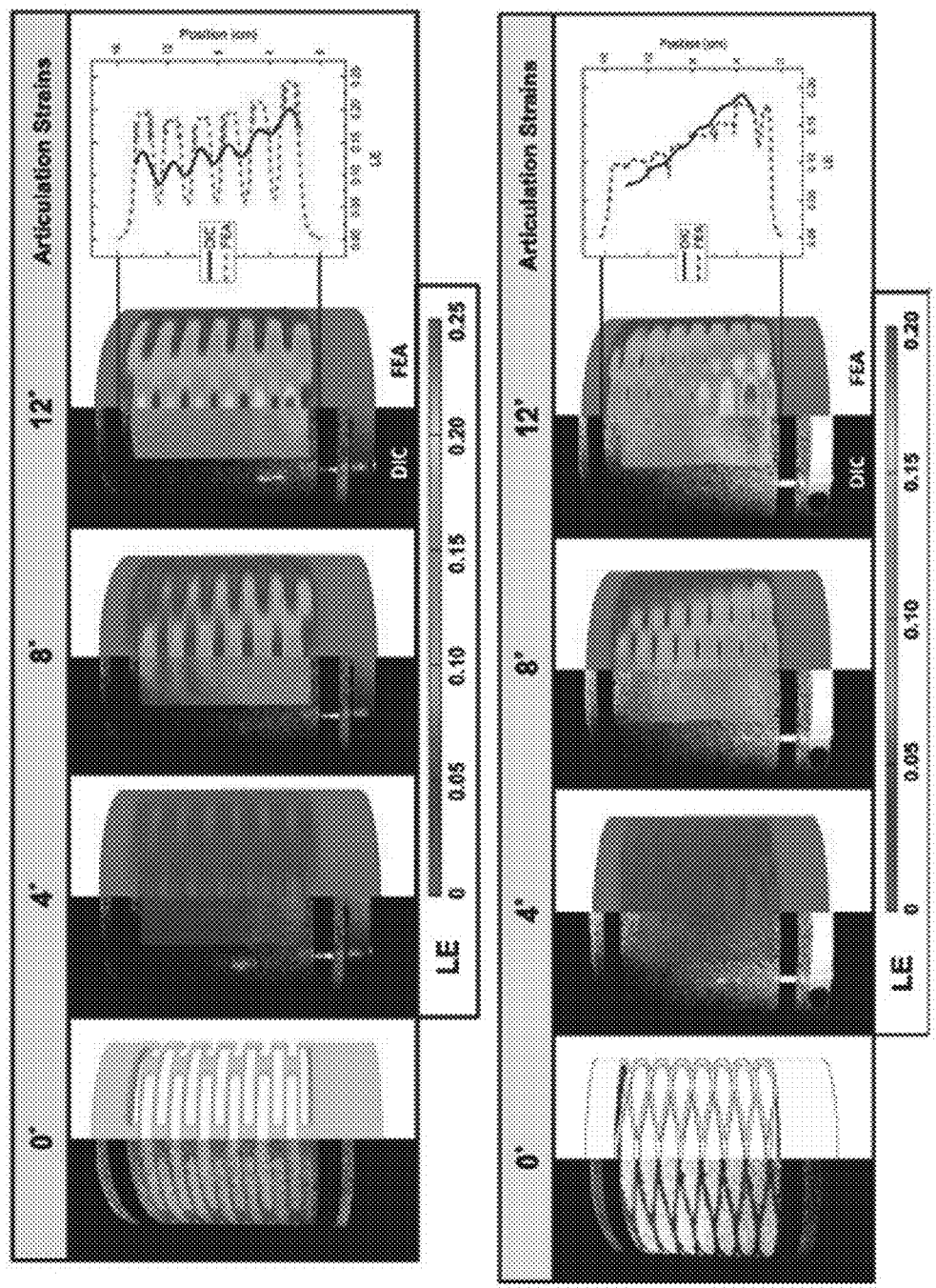
FIGS. 5A-5B present a comparison of articulation strain for a filled machined spring with an elastomer skin (FIG. 5A) and filled wave spring with an elastomer skin (FIG. 5B), both model and experimental, according to embodiments of the invention.
Figure 12:
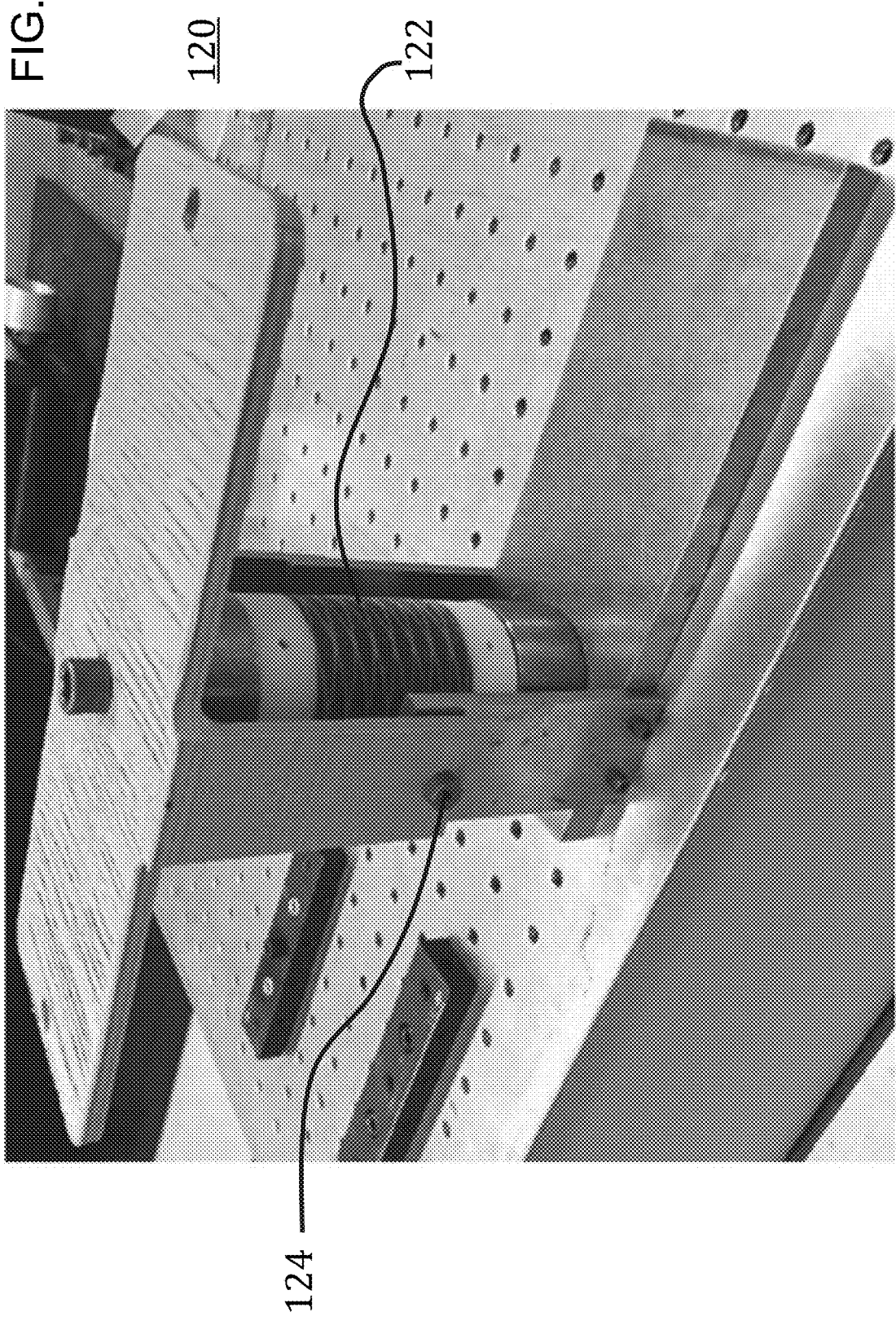
FIG. 12 presents a cylinder bending test fixture.

Elastomeric skins were speckled with a black, latex-based paint (see FIG. 12). Speckle size and density were tailored to the desired resolution and field of view. Two cameras (GRAS-20S4M from FLIR Systems, Inc.) with 35 mm lenses (Xenoplan 1.4/17-0903 from Schneider Kreuznach) were placed 0.75 m from the mounted skins. The strain maps from digital image correlation (DIC) were generated with VIC-3D software from Correlated Solutions. Strain maps were generated using DIC for configurations with circumferential reinforcing rings and an elastomeric skin (FIG. 4). Strain maps were generated using DIC for configurations with a machine spring skeleton (FIG. 5A) and a wave spring skeleton (FIG. 5B). Correlations with finite element analysis predictions verified the ability of models to accurately predict strains and deformation in the elastomer for any of these configurations.

Figure 6:
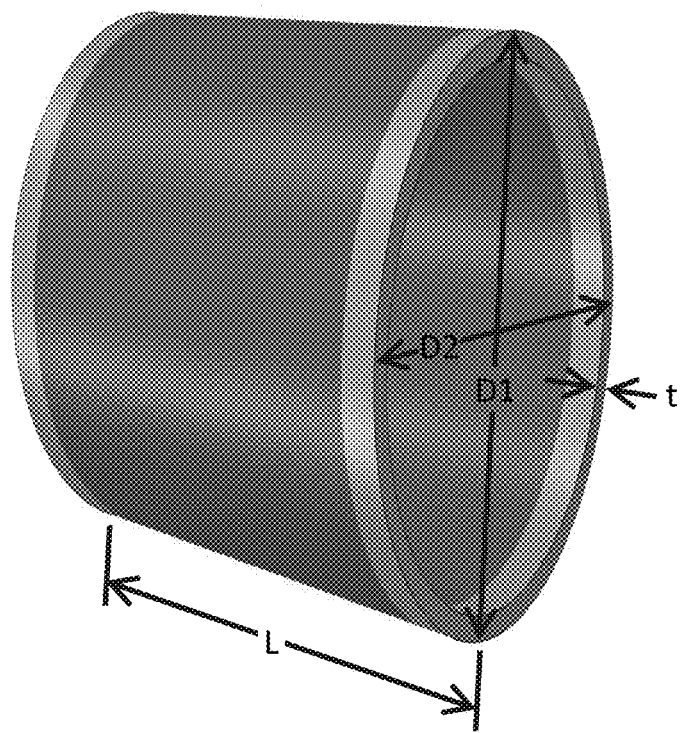
FIG. 6 illustrates parameter definitions for a general skin configuration.

FIG. 6 illustrates parametric definitions for the general shape of a flexible skin arrangement. D1 is a first diameter and D2 is a second diameter. D1 and D2 may be distinct values. D1 and D2 will be the same if the structure is a circular cylinder or tube. D1 and D2 will be different for elliptical or ovoid tubes. Value (t) corresponds to the wall thickness, and value (L) corresponds to the length of the spring structure.

Figure 7:
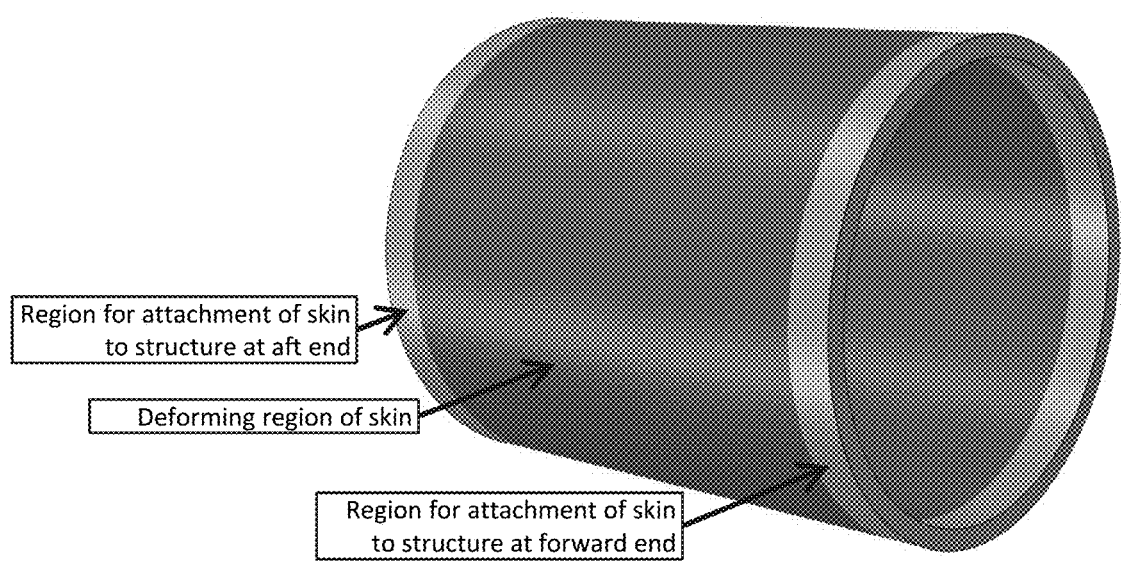
FIG. 7 illustrates a right circular cylindrical configuration having features for attachment to other structures at forward and aft ends.

FIG. 7 illustrates a general skin configuration in a right circular cylindrical form, illustrating various features including attachment zones at forward and aft ends, and a deforming/deformable region between.

Figure 8:
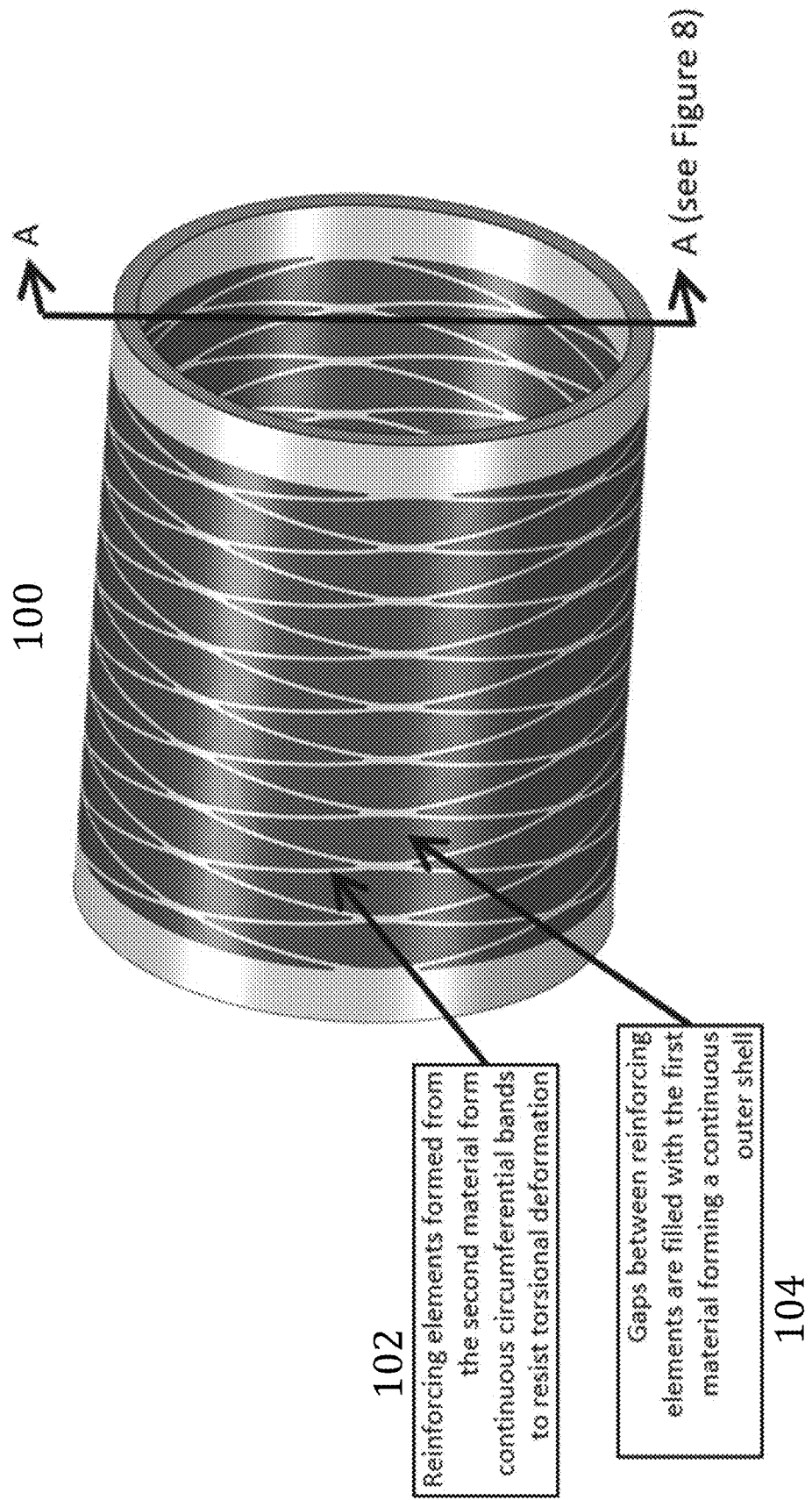
FIG. 8 illustrates a support structure with infill material skin.

FIG. 8 illustrates a support structure 100 incorporating infill material 104. As with all of the flexible structures described herein, at least two distinct materials are incorporated into the structure. A first material is used to form the reinforcing elements 102, which may be useful in resisting torsional deformation. The reinforcing elements 102 may form an open framework with an array of gaps which allow the structure to flex and bend. The open framework may be a helical spring structure with a single continuous gap between adjacent coils, or a more-complex spring having a plurality of gaps in a pattern, as depicted. A second material, e.g. an elastomer, may be employed to fill the gaps, and to encase the entire structure, if desired.

Figure 9:
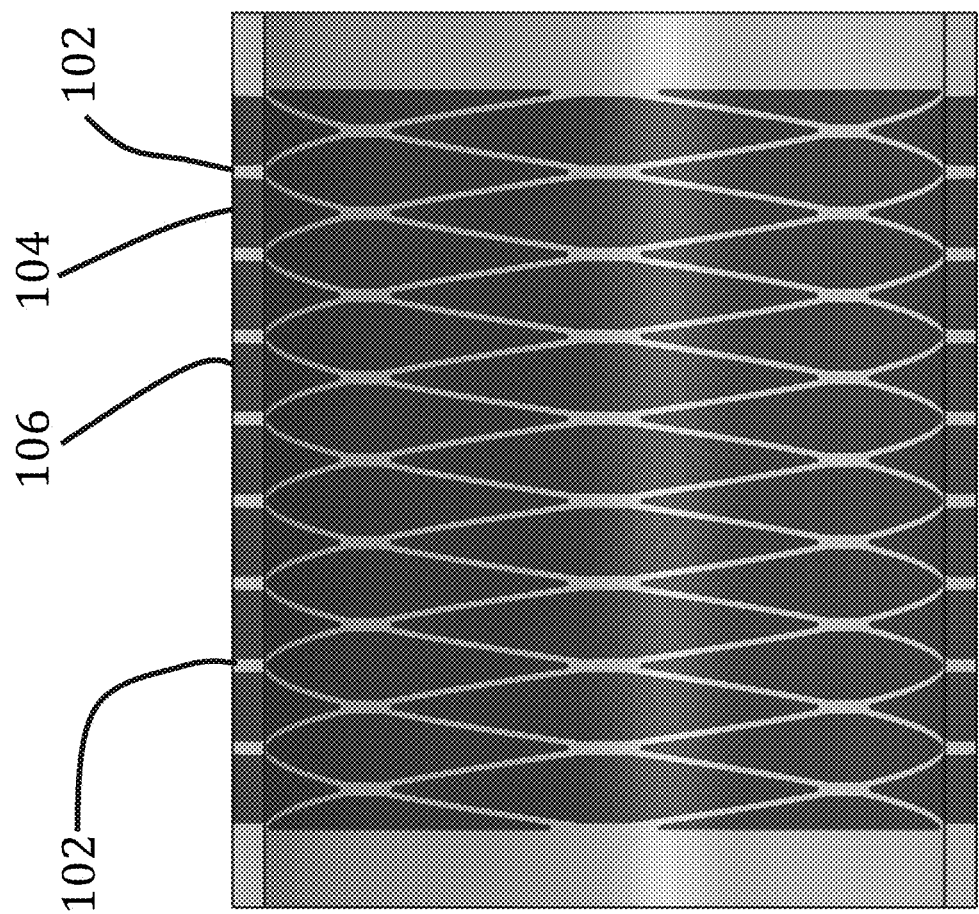
FIG. 9 presents a sectional view of the support structure with infill material skin of FIG. 7.

FIG. 9 depicts a sectional view along A-A of FIG. 8 to reveal an interior view of the structure 100. The reinforcing elements 102 and infill material 104 are evident.

Figure 10:
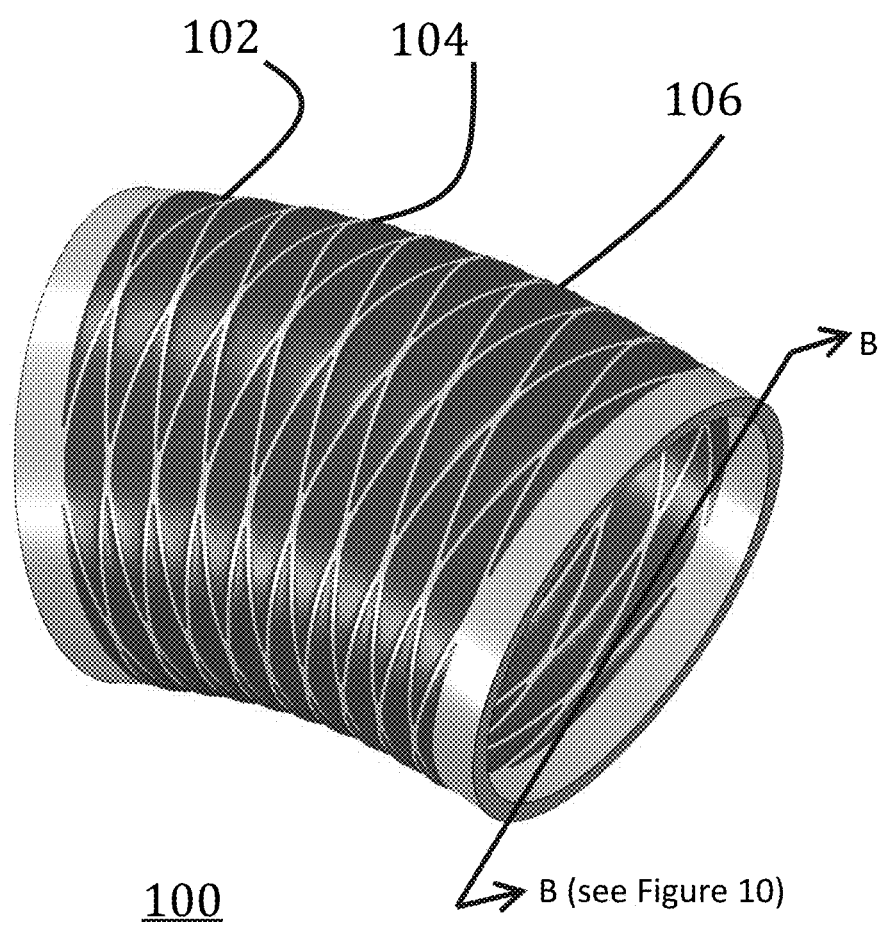
FIG. 10 illustrates the support structure of FIG. 7 articulated to 30 degrees.

FIG. 10 depicts a flexible support structure 100 articulated to 30 degrees. The infill material 104 provides support for the reinforcing elements 102, both in compression and in tension.

Figure 11:
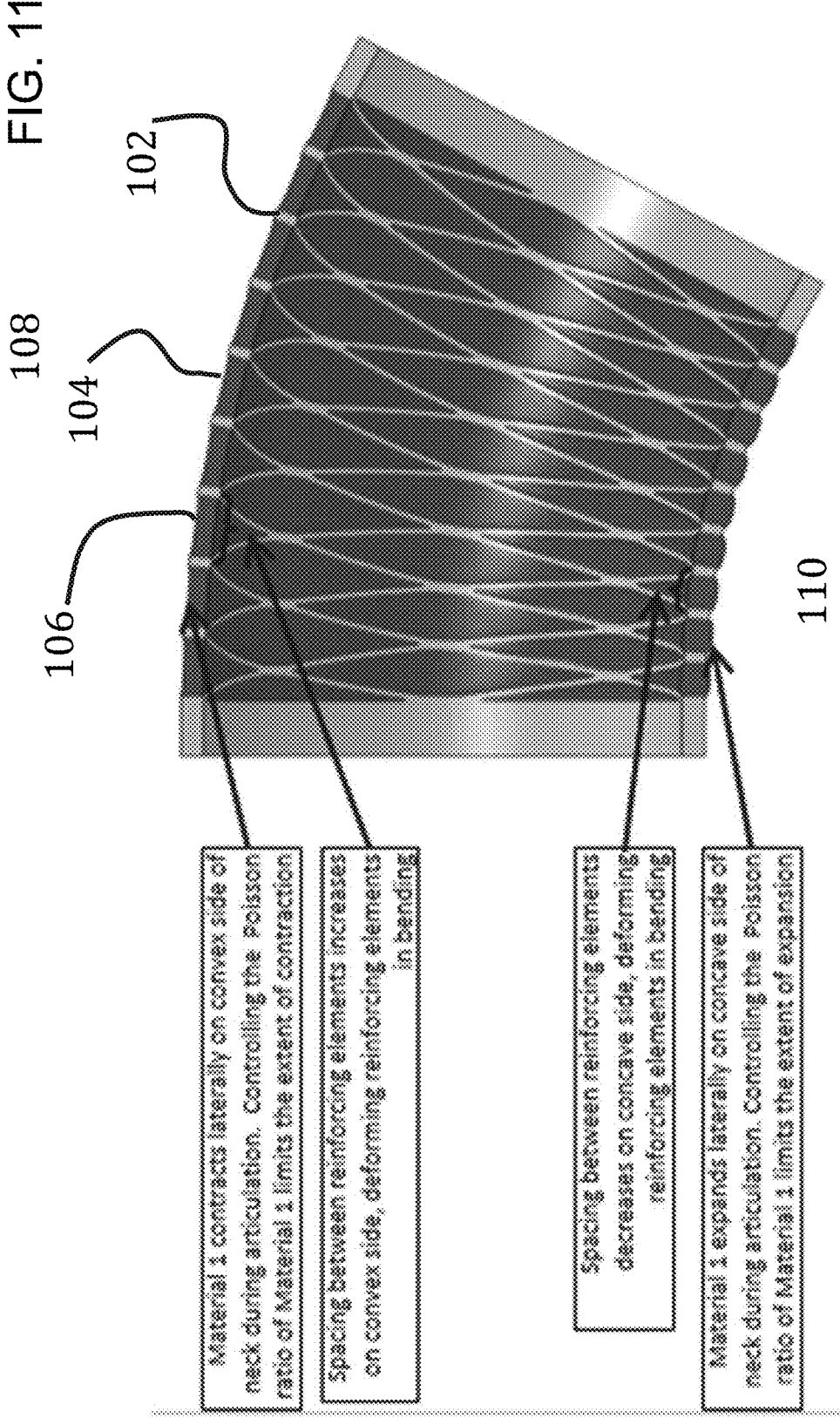
FIG. 11 illustrates the effects of articulation on the support structure of FIGS. 7 and 9.

FIG. 11 illustrate depicts a sectional view along B-B of FIG. 10 to reveal an interior view of the articulated structure. The reinforcing elements 102 and infill material 104 are evident. Spacing 106 between reinforcing elements 102 increases on the convex side 108 during articulation, deforming the reinforcing elements in bending. Spacing 106 between the reinforcing elements 102 decreases on the concave side 110 during articulation, deforming the reinforcing elements 102 in bending. The infill material 104, e.g. an elastomer, contracts laterally on the convex side 108 (and expands laterally on the concave side 110) during articulation. Controlling the Poisson ration of the infill material 104 limits the extent of contraction (and expansion).

Materials

Polydimethylsiloxane (PDMS) sheets (1 mm in thickness) were purchased from Rubber-Cal Inc. (Santa Ana, CA) and used for the elastomeric skins. Cut sheets were secured to the test fixture with hose clamps. For the reinforced designs, steel helical springs were acquired (Michigan Steel Spring Company, Detroit, MI). All springs had an inside diameter of 17.8 cm. The PDMS sheets were bonded to the springs with Flexseal Black RTV Silicone Sealant from Lawson Inc. (Des Plaines, IL). The springs were then bolted to the fixture for mechanical testing.

Mechanical Test Frame

Figure 13:
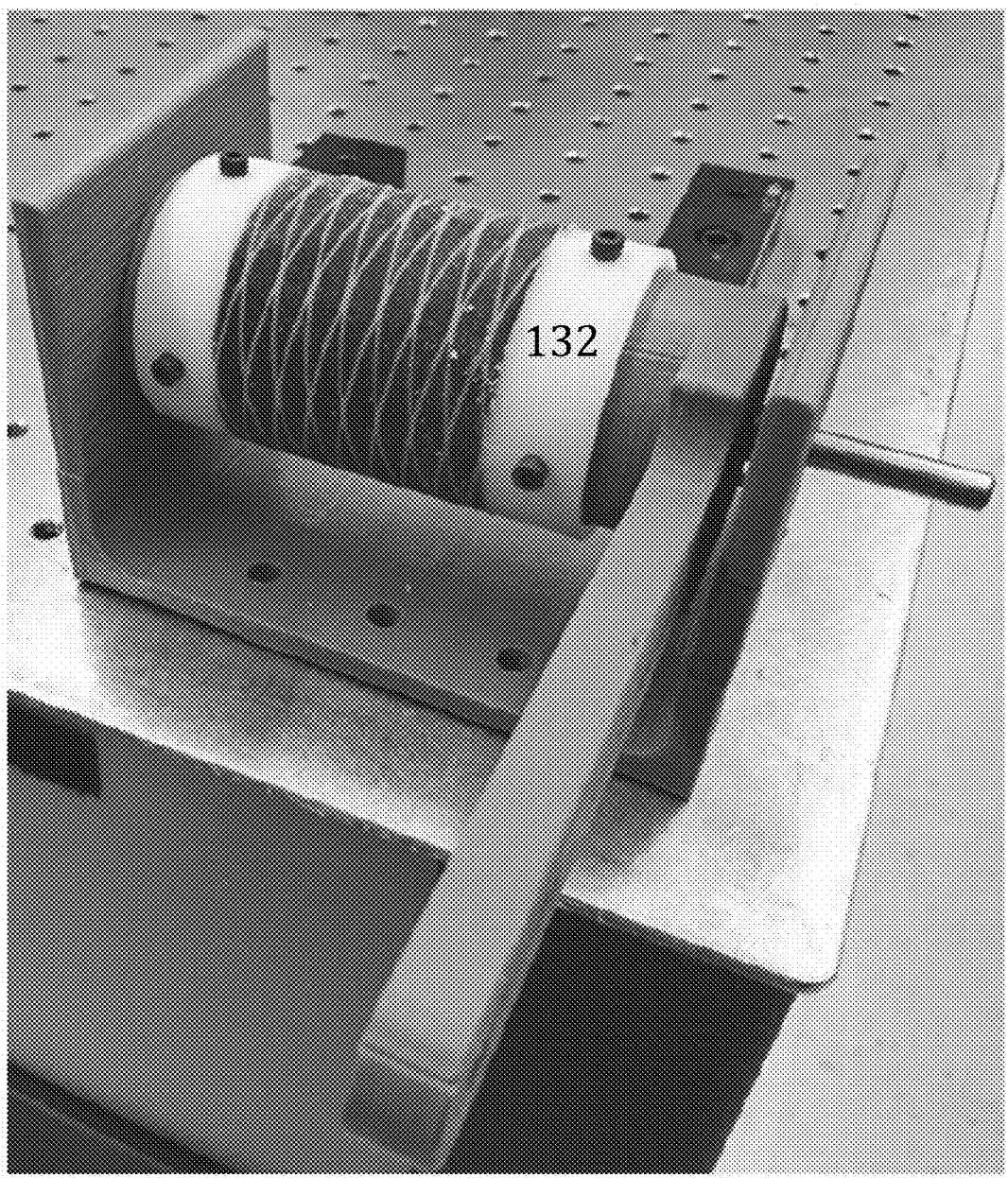
FIG. 13 presents a cylinder torsion test fixture.

A custom test fixture 120 was assembled to mechanically test the morphing skin prototype assemblies (FIG. 12). It was designed with the capability of bending a cylinder with a 17.8 cm inside diameter about a central pivot point 124 to a prescribed angle. Articulation kinematics and the resulting strains involved for the studied ranges of motion were collected for various designs. The applied bending moment is calculated by load*lever–arm*gravity. A wave spring embodiment 122 is presented, but the setup and principles are the same for each spring variation. Similarly, a custom torsion testing fixture 130 was assembled to test each embodiment in torsion. FIG. 13 presents a cylinder 132 mounted in the torsion test fixture. The cylinder mounts to the central section and a dead load is applied to the lever arm. The applied bending moment is calculated by load*lever-arm*gravity.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Cylinders were fabricated using a Stratasys Objet500 Connex3 printer capable of simultaneously printing in multiple materials. VeroWhite+ was selected as the stiff phase, and FLX9850 was used as the compliant material. Cylinders were manufactured with an outer diameter and a height of 50+−0.2 mm, and a wall thickness of 2.50+−0.2 mm. A pressure wash was used to remove support material from printed cylinders. Bending and torsion text fixtures were assembled primarily from additively manufactured parts. This allowed for highly tailored fixtures with short turn-around times. Parts that could not be printed, such as bushings and fasteners, were purchased. The bending test fixture 120 is shown in FIG. 12 and the torsion test fixture 130 is shown in FIG. 13.

The ablative material comprised a low-temperature polymer elastomer (polyisoprene-butadiene copolymer or polysiloxane) containing nanosilica or Hafnium particles that is infused into a high-strain carbon fiber felt material. Upon exposure to high temperature, the low-temp polymer nanocomposites are converted to high temperature carbonaceous material with a high char yield and the felt help holds it together under strain. It is able to handle more than 3,000° F. for more than 5 minutes.

Materials—We used a ceramic composite of $Al_2O_3$ fibers in an $Al_2O_3$ matrix —Ox-Ox. The SiC/SiC composite is also a robust option.

General Skin Description

The skin may comprise a generally cylindrical shell, i.e. skeleton, connecting a distal end and a proximal end, and a longitudinal axis along its length; having length "L", radius "r", and thickness "t", which bends continuous from theta=0 (collinear with distal and proximal end) to greater than theta=0.22 $L*t/r^2$ without buckling a generally cylindrical shell connecting a distal end and a proximal end, and a longitudinal axis along its length; which bends continuously from theta=0 (collinear with distal and proximal end) to greater than theta=30 degrees without buckling able to withstand 20 psi of radial pressure without more than a 2.5 mm deformation at an point on the skin. Can withstand 285° C. (546° F.) without degradation. Suitable materials include a steel skeleton and a thioether elastomer filled with microballoons to tune the Poisson ratio.

Composite Skins

The inventive arrangement comprises a composite of high strain materials (i.e. infill materials) and reinforcing elements having a continuous surface and requiring work to articulate, i.e. the total energy needed to bend the cylinder, greater than 7 N-m at 25 degrees of bending. The high-strain materials may include elastomers, both foamed and monolithic, including silicones, polyether, and polyurethane. The reinforcing elements, i.e. skeleton, may include rigid plastics (including polycarbonate blends) and steel. The reinforcing elements may be made by additive printing. The reinforcing elements may include continuous circumferential paths of reinforcement to impart torsional rigidity. The reinforcing elements may also include rigid features that interlock upon torsional deformation to impart increasing levels of torsion rigidity. The apparatus may be coated with an ablative material, which allows the skin to survive at least 850° C. for at least 10 minutes. As described above, the ablative material may comprise a low-temperature polymer elastomer (e.g. polyisoprene-butadiene copolymer or polysiloxane) containing nanosilica or Hafnium particles that is infused into a high-strain carbon fiber felt material. Upon exposure to high temperature, the low-temp polymer nanocomposites are converted to high temperature carbonaceous material with a high char yield, and the felt helps hold it together under strain. It is able to handle more than 3,000° F. for more than 5 minutes.

Figure 14:
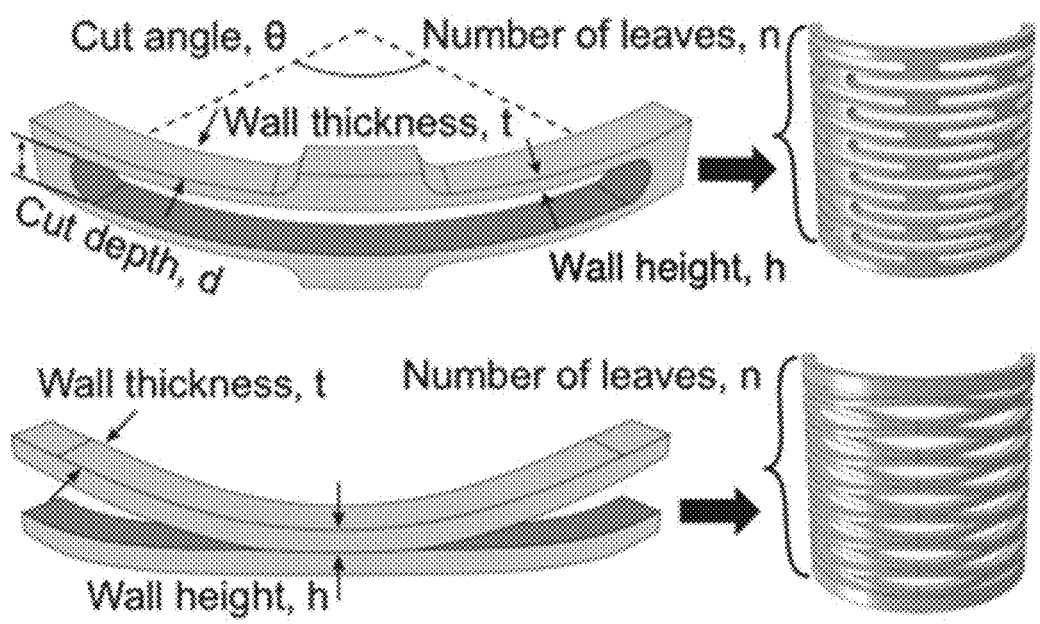
FIG. 14 presents some exemplary parameters for a machined spring and a wave spring.

Some non-limiting exemplary parameters for a machined spring and a wave spring are presented in FIG. 14. The presented data demonstrates controllable stiffness values corresponding to variations in wall height and wall thickness. The wall thickness (t) range may be 5-12 mm, the cut depth (d) range may be 7-9 mm, and the wall height (h) range may be 1-5 mm. The stated ranges are approximate and will depend on the selected materials and the desired performance characteristics of the finished device.

Figure 15:
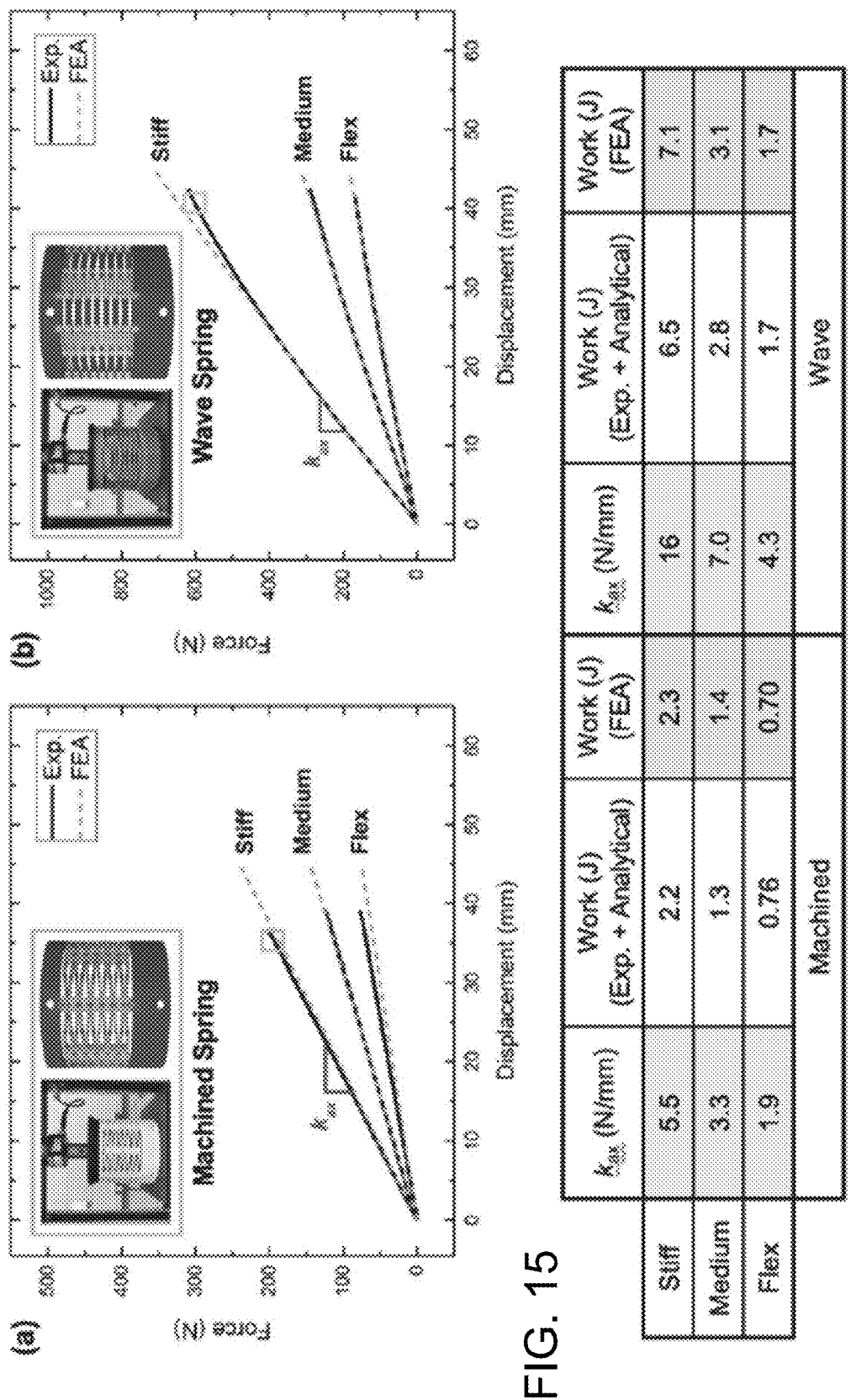
FIG. 15 presents force-displacement relationships for (a) machined springs and (b) wave springs.

FIG. 15 presents force-displacement relationships for (a) machined springs and (b) wave springs. Both measured (Exp.) and finite element analysis (FEA) values are included for comparison. At high displacements, local plasticity in the stiff wave spring led to deviations from the linear behavior predicted in FEA.

Figure 16:
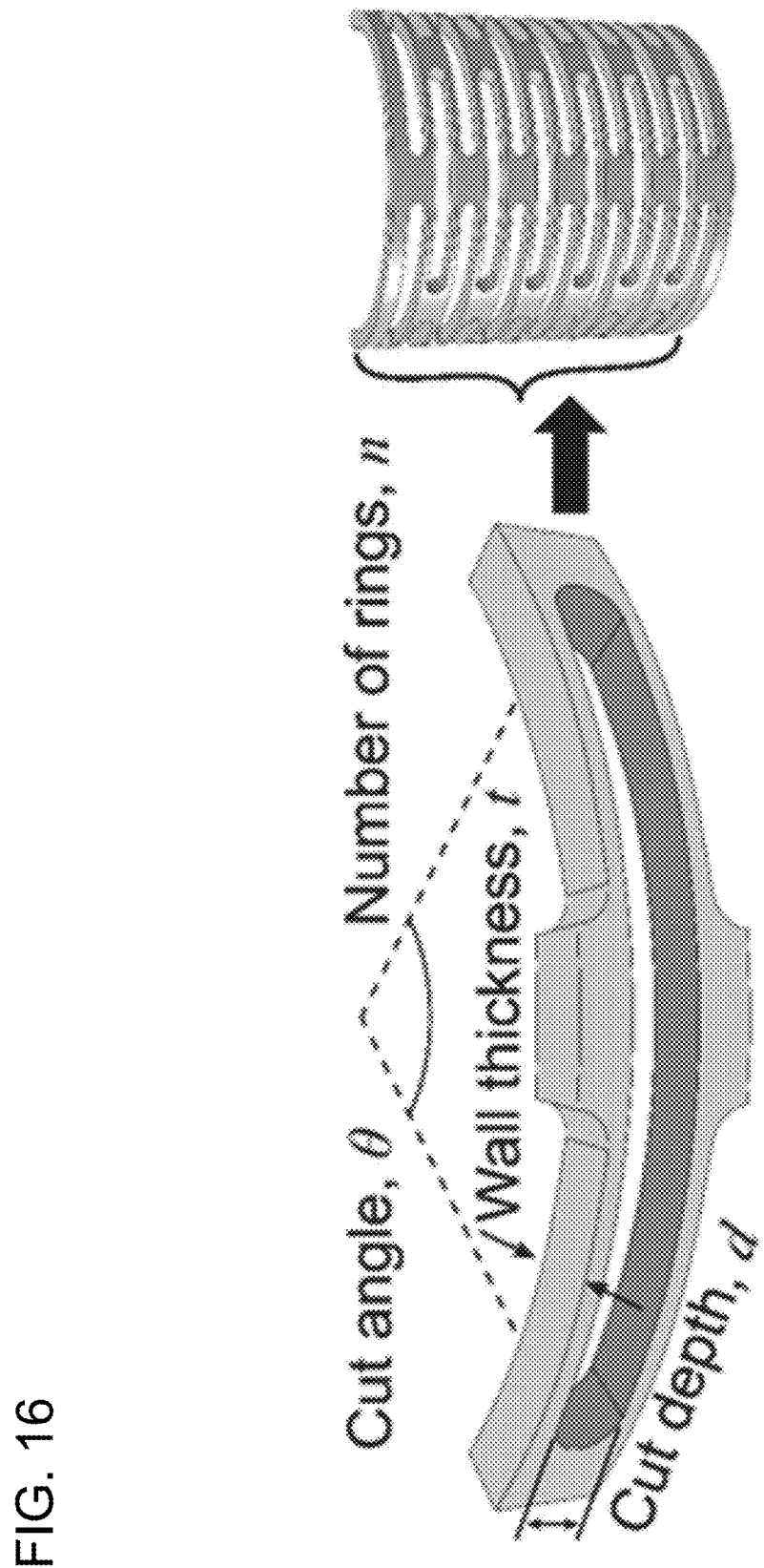
FIG. 16 presents a cell for an exemplary machined spring.

FIG. 16 presents a cell for an exemplary machined spring. A single cell of the machined spring may be a repeating unit having a defined geometry. The cut angle (θ) is measured radially from the center of the generally circular spring. The properties of the machined spring may be tailored to the design requirements through variations in the cut angle (θ), cut depth (d), wall thickness (t), the number of rings (n), and the material from which the machined spring is made. Table 1 (below) presents approximate dimensions and values for the physical parameters of a machined spring. The stated ranges are approximate and will depend on the selected materials and the desired performance characteristics of the finished device.

TABLE 1

| Variable | Min. Value | Max. Value |
| --- | --- | --- |
| Wall Thickness, mm | 5 | 12 |
| Cut Depth, mm | 7 | 9 |
| Number of Rings, — | 5 | 9 |
| Revolution Symmetry, — | 4 | 8 |
| Cut Angle, degrees | 38 | 44 |
| Skin Thickness, in | 3/32 | 1/8 |

Figure 17B:
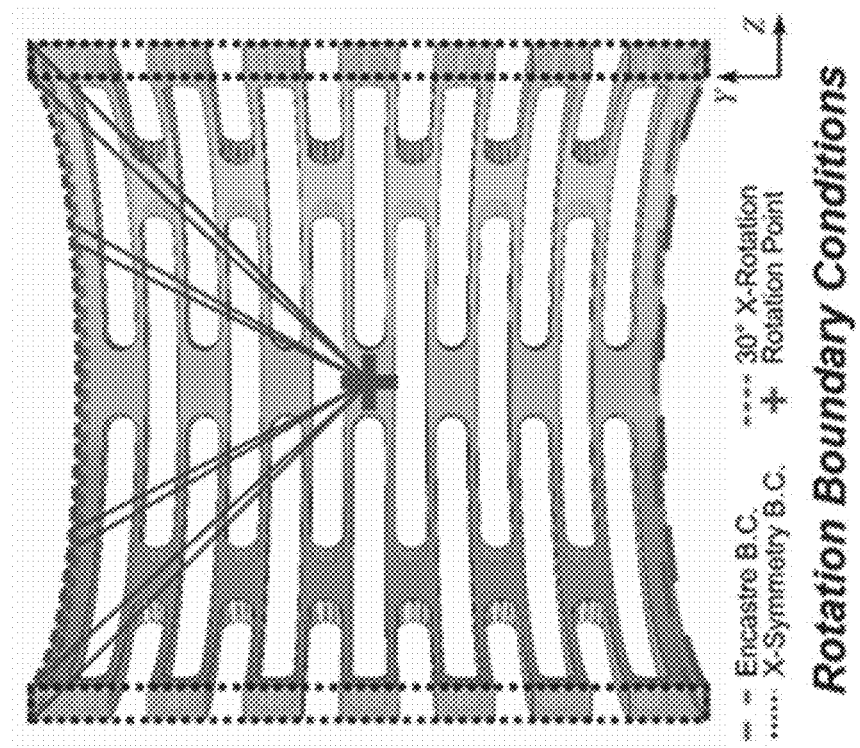
FIGS. 17A-17B present pressure boundary condition (FIG. 17A) and rotation boundary conditions (FIG. 17B) for an exemplary machined spring.
Figure 17A:
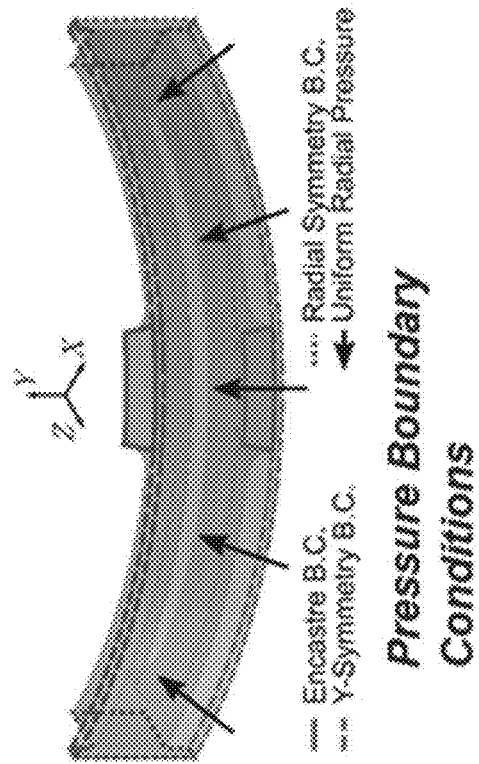

FIGS. 17A-17B present pressure boundary conditions (FIG. 17A) and rotation boundary conditions (FIG. 17B) for an exemplary machined spring. FEA may be used to determine limiting material strain. Dimensions of the spring, e.g. machined spring or wave spring or any other configuration, may be parameterized in order to optimize the spring's performance. The spring may be machined, molded, or additively-manufactured. The spring corresponds to the 'skeleton' of the inventive arrangement. The skeleton performs the role of a flexible support for the 'infill' material, which is described below.

Figure 18:
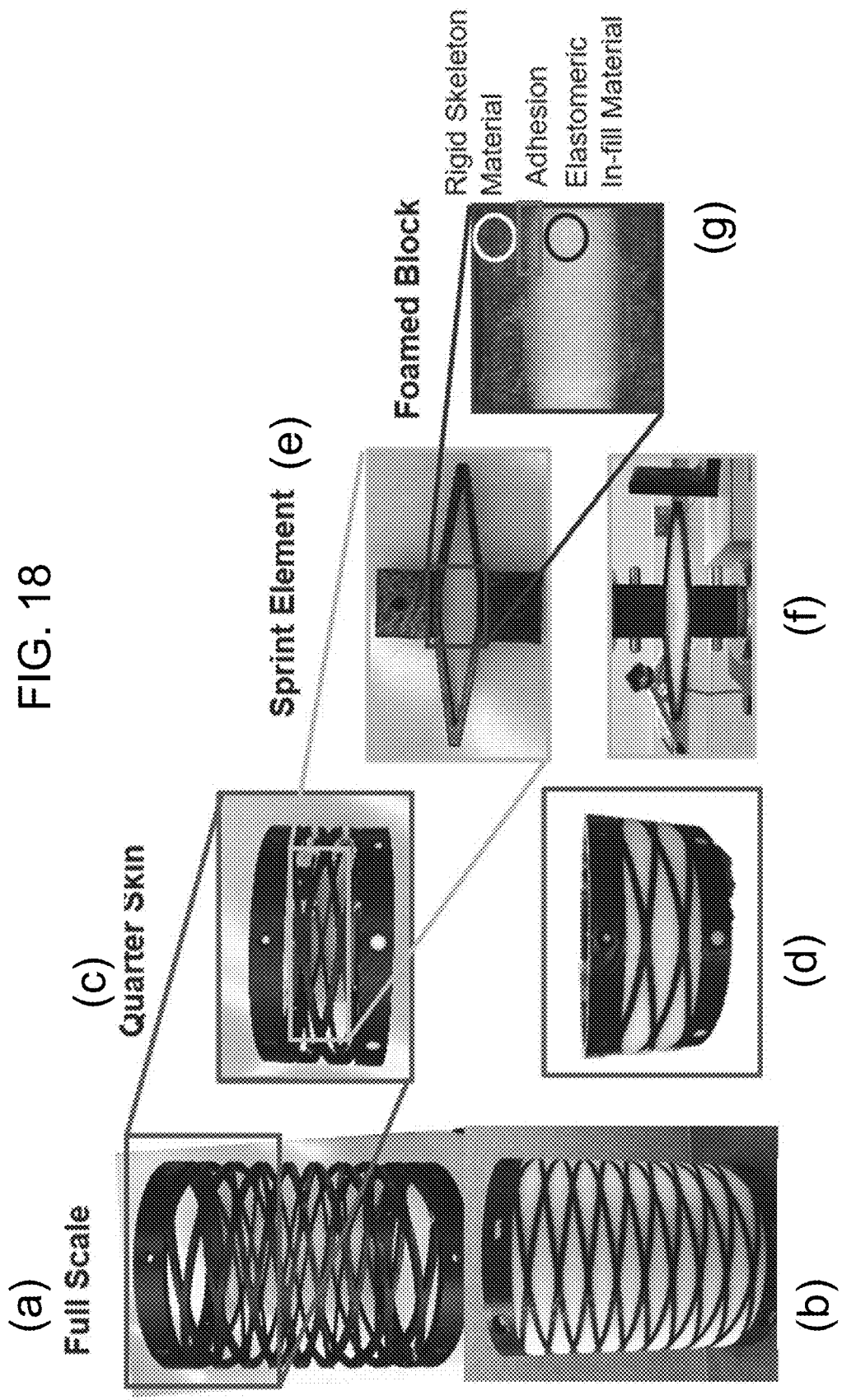
FIG. 18 presents side views of (a) a wave spring, (b) a wave spring with infill material, (c) a quarter skin variation of the wave spring, (d) the quarter skin variation with infill material, (e) a skeleton cell, (f) a cell with infill material, and (g) a close-up view of the interface between the skeleton material and the elastomeric infill material.

FIG. 18 presents side views of (a) a wave spring, (b) a wave spring with infill material, (c) a quarter skin variation of the wave spring, (d) the quarter skin variation with infill material, (e) a skeleton cell, (f) a cell with infill material, and (g) a close-up view of the interface between the skeleton material and the elastomeric infill material.

It was discovered that limiting the Poisson ratio of the infill material 104 to a certain range aids in minimizing surface undulations when the skin is articulated. Originally, it was thought that the Poisson ratio of the infill should be 0 (i.e. completely compressible infill material) to minimize surface undulations during articulation. However, this is not supported by the results. Our design process has shown that moderate compressibility, as exhibited by Poisson ratio in the range of about 0.1 to 0.4, is advantageous for reducing surface undulations relative to infill materials that have Poisson ratio above or below that range.

In addition, a further consideration is the tradeoff between cell size, ligament thickness, and infill stiffness in order to achieve a desired articulation angle while avoiding local buckling of material in the cells or global buckling of the entire structure. For a specified spring length, outer diameter, and wall thickness, and selecting specific materials for the structure, there is an optimal cell configuration that maximizes articulation angle subject to a constraint set by limiting pressure-driven wall deformation. Having more than the optimal number of cells in the axial direction results in buckling at lower articulation angles due to excessive in-plane loads when the skin is articulated. Having less than the optimal number of cells in the axial direction results in higher strains at ligament intersections and in higher lateral skin deformation due to lateral pressure loads.

Figure 19:
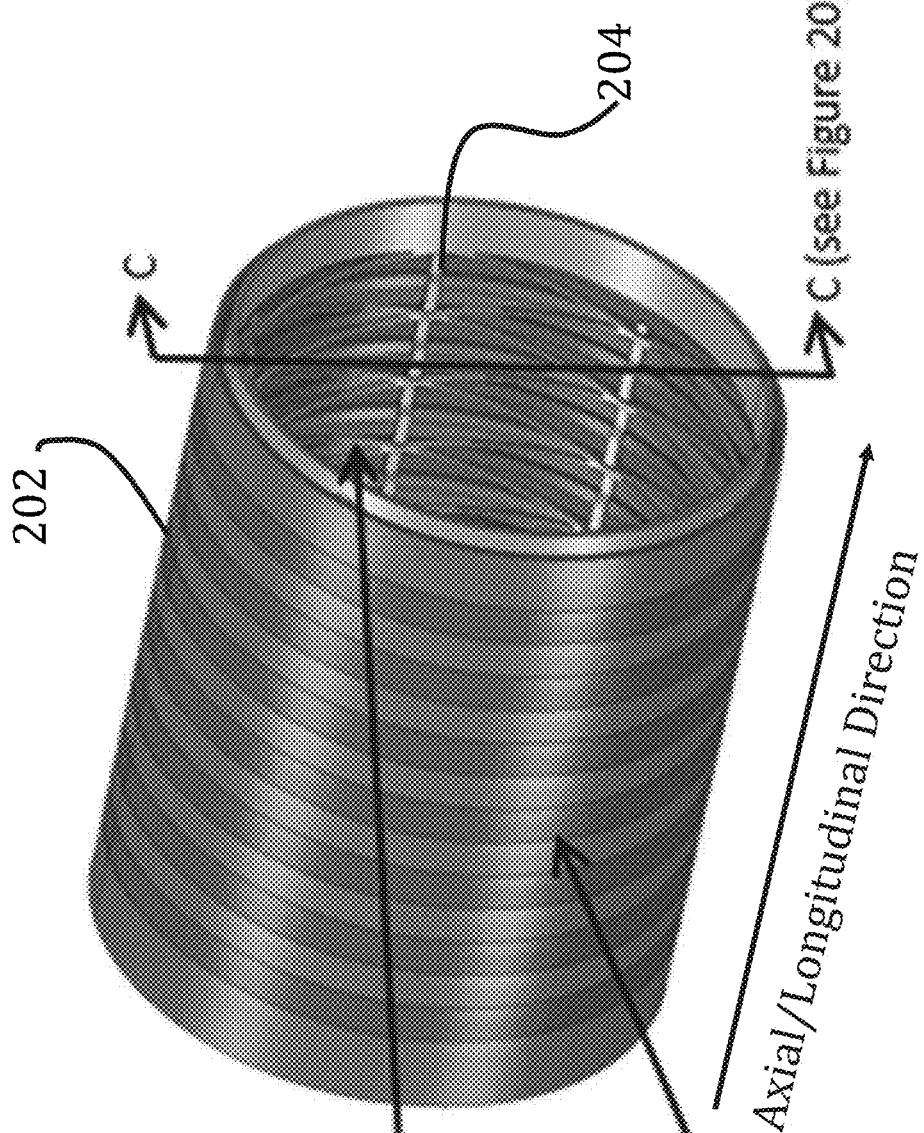
FIG. 19 illustrates rings on a compliant frame skin arrangement (millipede skin), showing regions of differing materials.

FIG. 19 illustrates a 'millipede' structure 200 having successive rings 202 mounted on a compliant, flexible frame 204. The internal compliant frame structure 204 (i.e. flexible support structure) forms continuous circumferential bands to resist torsional deformation and hold rings in desired axial alignment. The rings 202 form an exterior skeleton that is discontinuous in the axial direction, but which overlap in the axial direction. Each ring 202 is attached to the underlying frame structure 204, but not to each other, in order to permit flexibility of the overall millipede structure 200. The underlying frame 204 will be a single piece. The frame 204 may either be fabricated as a single item (using additive manufacturing techniques or other approaches) or may be fabricated from several items that are subsequently attached rigidly together. The rings 202 may be formed from any classes of materials with sufficient structural rigidity to resist deformation due to pressure loads, including metals and carbon matrix composites. For elevated temperature applications ceramic matrix composites may be used to form rings that can survive extended exposure at 850° C. The compliant frame may be formed from any of several classes of materials, including structural plastics and metals, that have sufficient elongation to preclude damage when the skin is articulated over its full range of motion.

Figure 20:
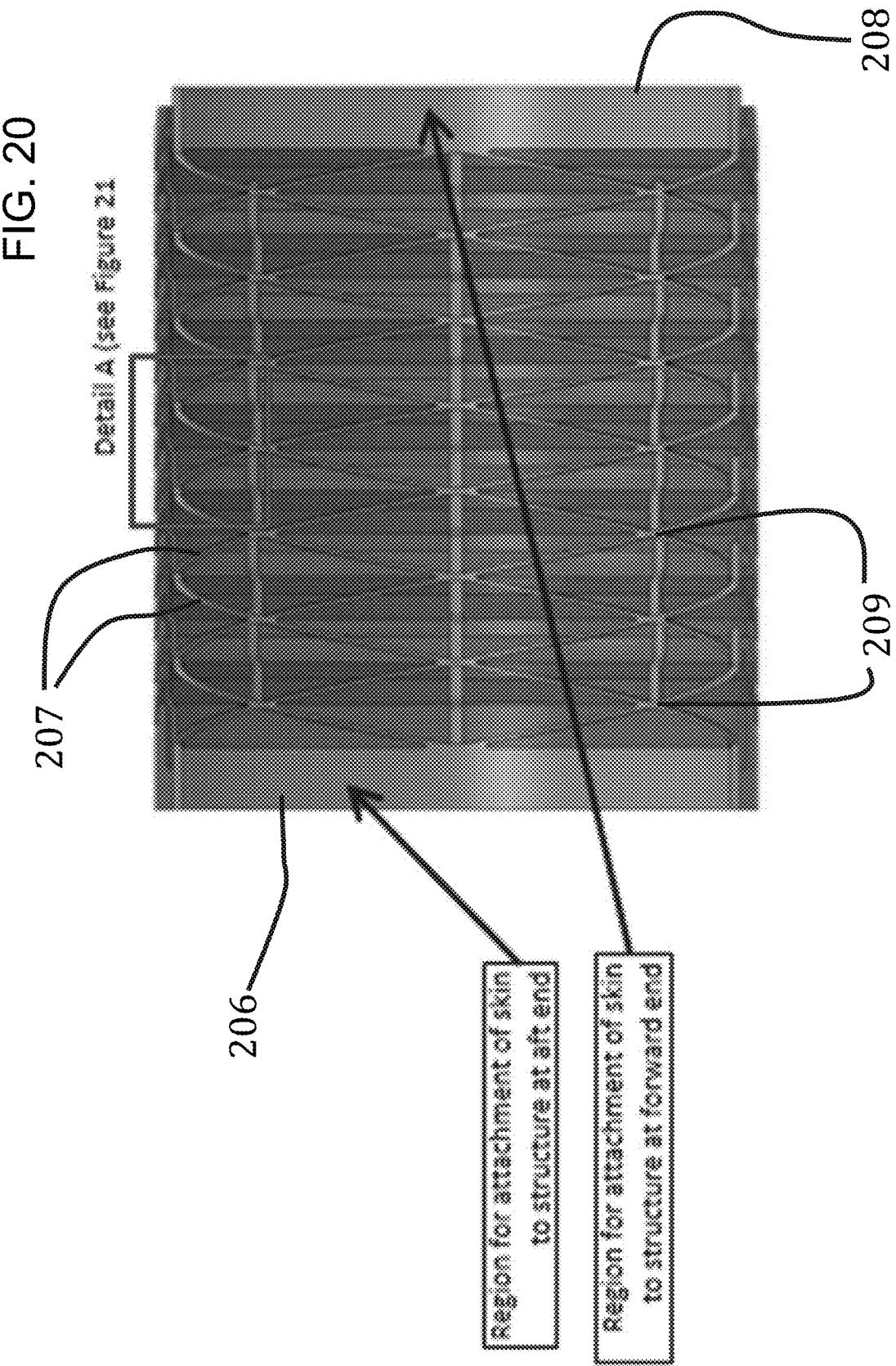
FIG. 20 illustrates section C-C of FIG. 19 showing an interior view of a rings on compliant frame skin.
Figure 21:
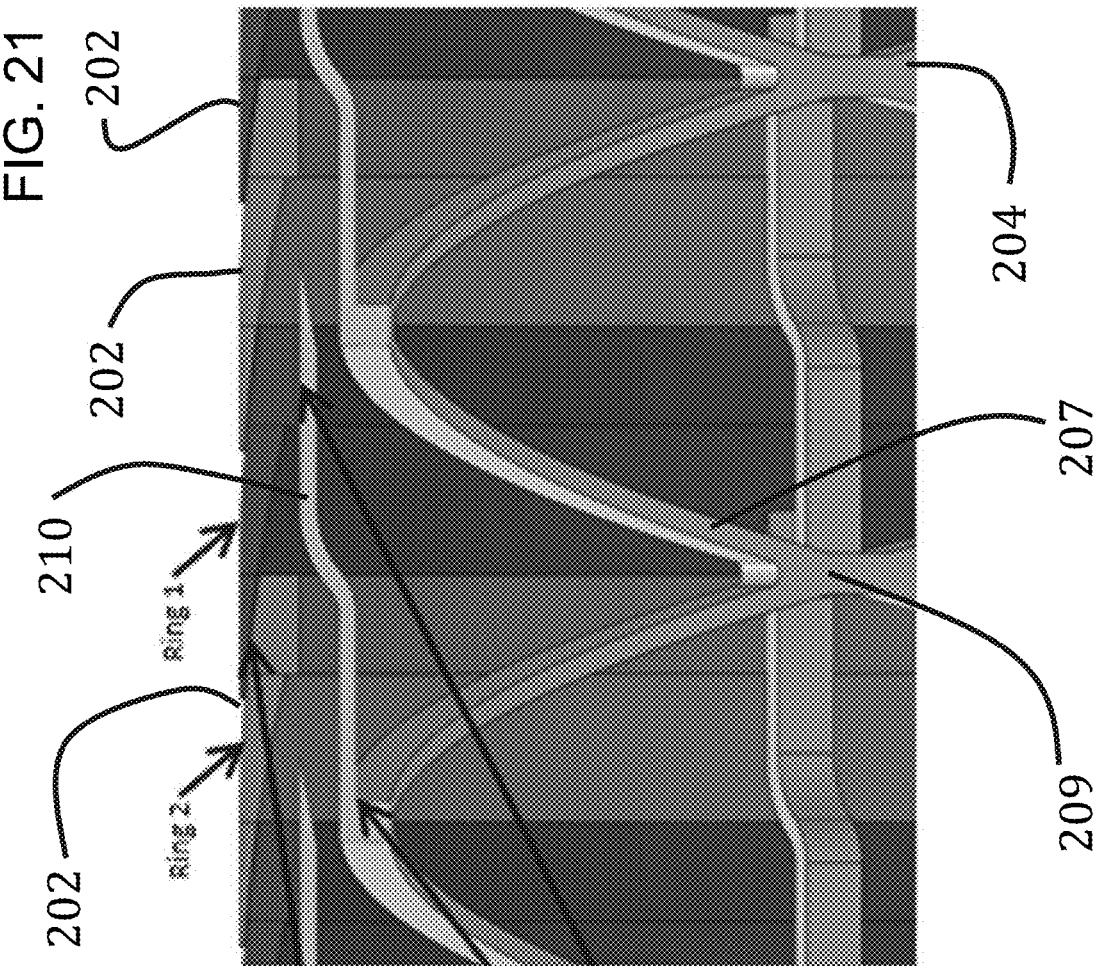
FIG. 21 presents detail A from FIG. 20 illustrating key features of a rings on compliant frame skin.

FIG. 20 illustrates a sectional view along section C-C of FIG. 19. A region for attachment of the millipede structure 200 is provided at the aft end 206 and forward end 208. The compliant frame 204 comprises continuous helical paths 207 to impart torsional rigidity to resist torsion motion. The continuous helical paths 207 of the compliant frame 204 comprise at least one left-handed helical path and at least one right-handed helical path which form intersections 209 every 90 degrees or less around the circumference of the compliant frame 204. FIG. 21 illustrates a closeup of a detail portion (Detail A) of the apparatus illustrated in FIG. 20. Two rings are described for clarity. The two rings are representative of the remainder of the rings in the millipede structure 200. In this case, Ring 2 is aft of Ring 1; the interior mating surface of Ring 1 overlaps the forward outer edge mating surface of Ring 2. The mating surfaces of each ring are spherical for circular cylinder millipede skin structures, and ellipsoidal for elliptical cylinder millipede skin structures (see FIG. 23D). A plurality of connection clips 210 are fixed to the compliant frame structure at a clip's proximal end (see FIG. 23C). The distal end 212 of each clip 210 is mechanically fastened to a forward inner surface 214 of a ring 202. The points of connection between the connection clips 210 and rings 202 are offset in the longitudinal, axial direction (see FIG. 21) to allow the rings 202 and compliant frame 204 to pivot about a theoretical center of the spherical or ellipsoidal shape that forms the interface between the rings, e.g. Ring 1 and Ring 2.

Figure 22:
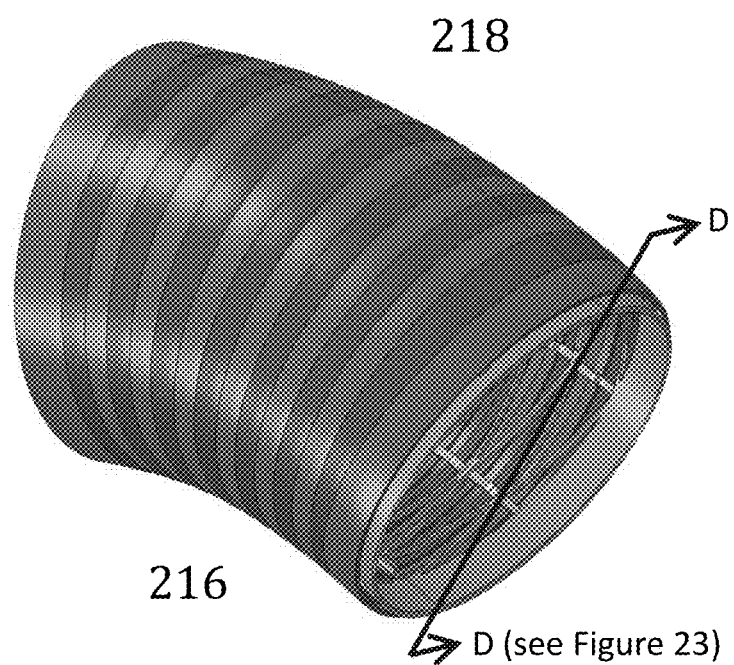
FIG. 22 illustrates a rings on compliant frame skin articulated to 30°.

FIG. 22 illustrates a millipede structure 200, i.e. rings 202 on a compliant frame 204, articulated to 30 degrees. This figure illustrates the effect of compression on the concave side 216 and tension on the convex side 218 of the rings on a compliant frame.

Figure 23A:
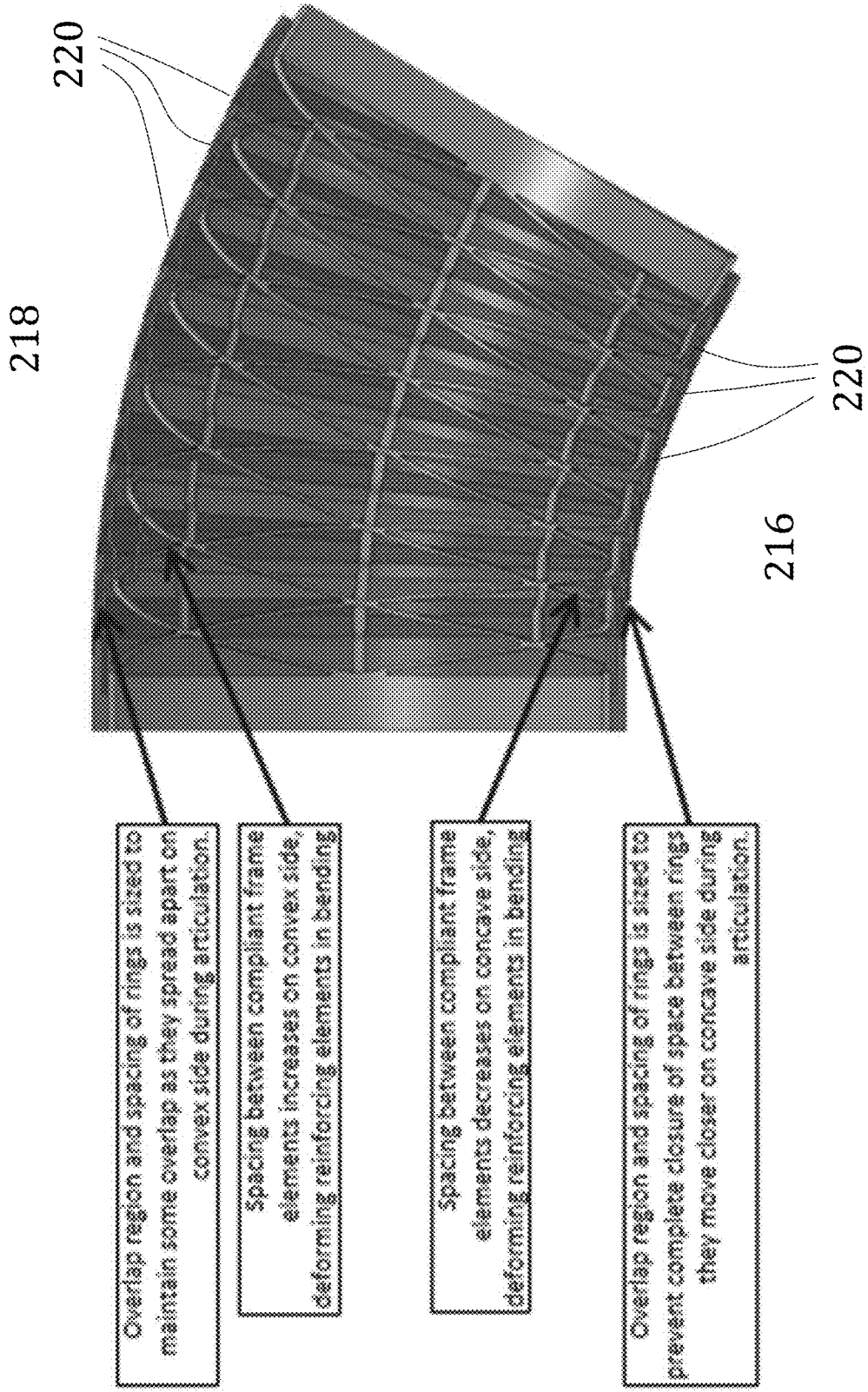
FIG. 23A presents section D-D from FIG. 22 illustrating effects of compression on concave side and tension on convex side of rings on compliant frame skin.

FIG. 23A presents a sectional view along D-D of FIG. 22. Note that the overlap region of the rings and the spacing of the rings is sized to maintain some overlap on the convex side 218 during articulation. On the convex side, spacing between the reinforcing elements 220 of the compliant frame 204 increases during articulation, forcing the reinforcing elements 220 to bend and flex to stay in contact with the rings 202 to which the reinforcing elements 220 are fixed. Conversely, spacing between compliant frame elements 220 decreases on the concave side 216, which also flexes and deforms the reinforcing elements 220 to maintain contact with the rings 202. One the concave side, the overlap region of the rings is sized to prevent complete closure of the space between rings as they move closer during articulation.

Figure 23B:
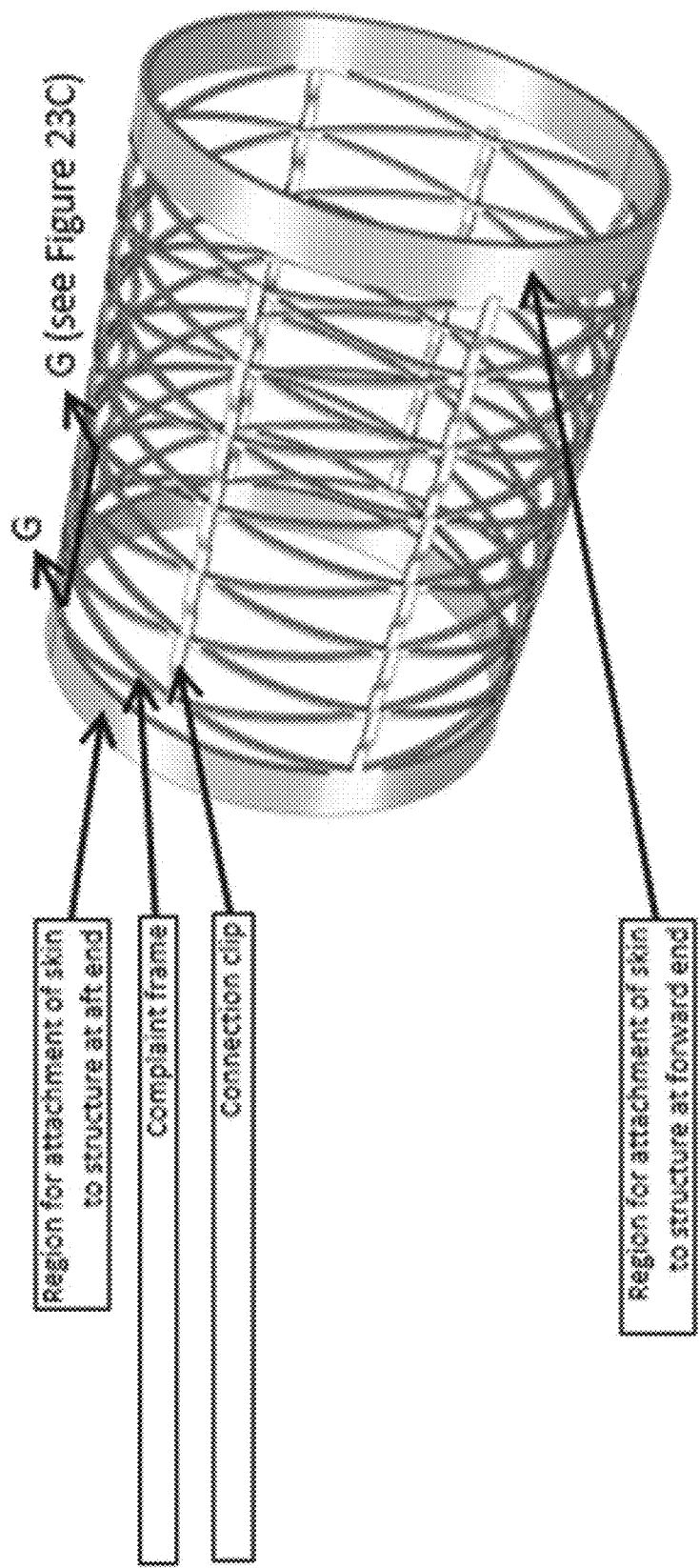
FIG. 23B illustrates a compliant frame and attachment clips for rings on compliant frame skin shown without exterior rings.
Figure 23C:
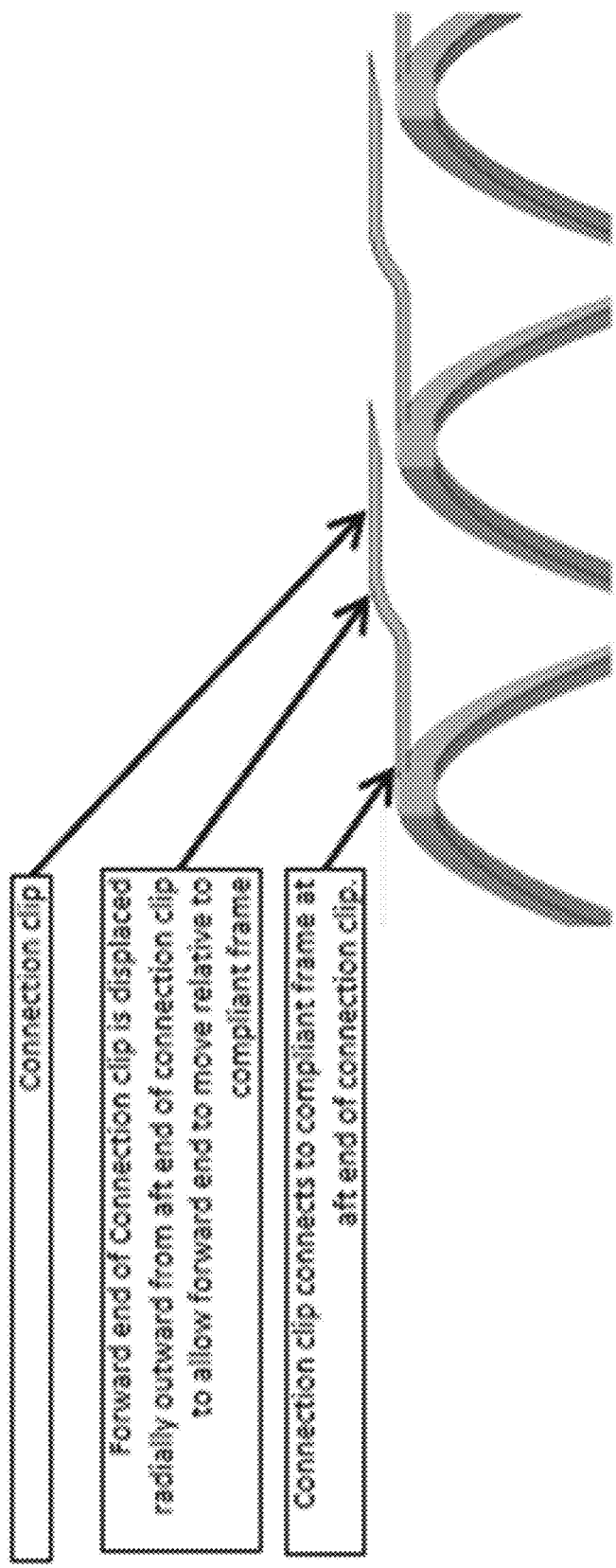
FIG. 23C presents detail G-G from FIG. 23B showing compliant frame and attachment clips.

FIG. 23B-23C illustrate details of the compliant frame 204 without the rings 202. Attachment regions fore 208 and aft 206 are provided to attach the millipede structure 200 to another structure. The open framework of the compliant frame 204 is evident. The sectional view G-G of FIG. 23B is presented in FIG. 23C. The forward/distal end 208 of each connection clip is displaced radially outward from the aft/proximal end 206. This arrangement permits the forward end to move and flex relative to the compliant frame 204 without binding or jamming.

Figure 23D:
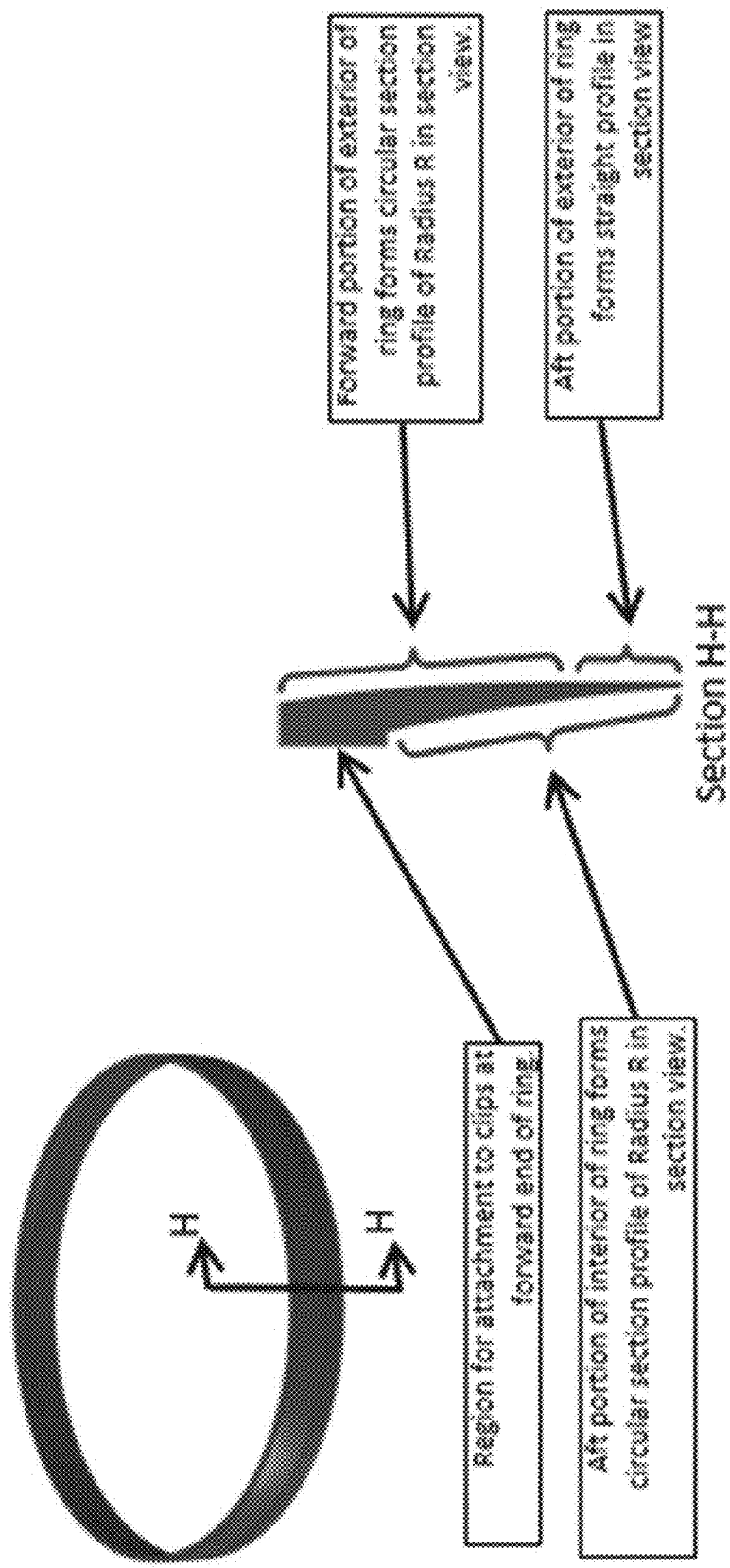
FIG. 23D presents details of outer ring for rings on compliant frame skin.

FIG. 23D illustrates details of the rings 202. The sectional view along H-H reveals a forward region 222 having a face 214 for attachment to the clips 210. An aft portion 224 tapers radially outward and narrows, with a flat outward face (i.e. constant outer radius) at the end of the ring. A forward outer face 226 has a circular section profile of constant radius. An aft outer face 228 has a straight, flat section profile.

Figure 24:
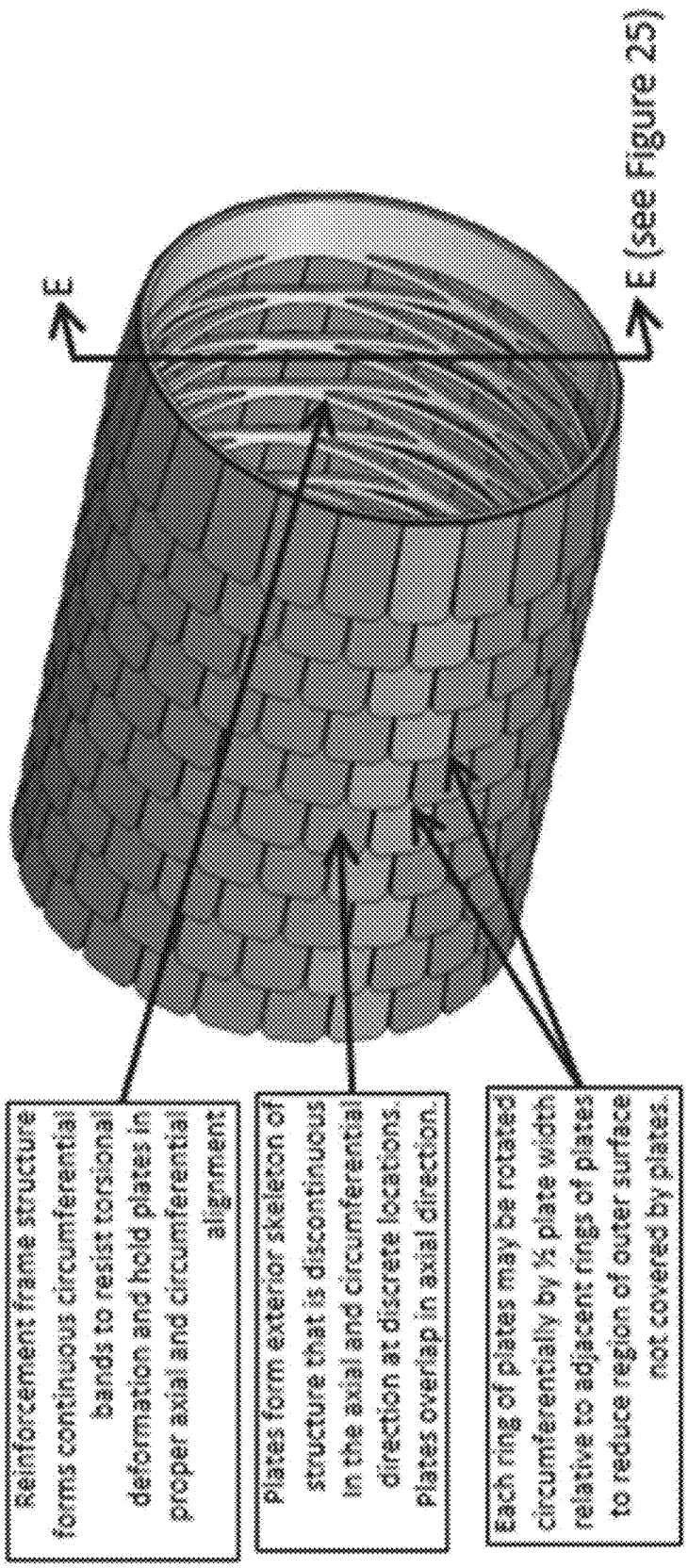
FIG. 24 illustrates a plates on reinforcement frame skin arrangement (dragon skin), showing regions of differing materials.

FIGS. 24-30 illustrate features of the 'dragon skin' embodiment 300, which includes a plurality of plates 302 on a flexible reinforcement frame 304. FIG. 24 illustrates a plurality of plates on a frame, i.e. 'dragon skin', showing regions of differing materials. A reinforcement frame structure 304 forms continuous circumferential bands which are useful in resisting torsional deformation, and which holds the plurality of plates 302 in axial and circumferential alignment. The plurality of plates 302 form an exterior structure that is discontinuous in the axial and circumferential directions at discrete locations. The plates 302 overlap in the axial direction and are arranged in rings in the radial direction, as illustrated in FIG. 24. Each ring of plates 302 may be rotated circumferentially by ½ plate width relative to adjacent rings of plates to reduce the region of the outer surface of the embodiment not covered by plates, as illustrated in FIG. 24. The plates 302 may be formed from any classes of materials with sufficient structural rigidity to resist deformation due to pressure loads, including metals and carbon matrix composites. The reinforcing frame 304 may be formed from any of several classes of materials, including structural plastics and metals, that have sufficient elongation to preclude damage when the skin is articulated over its full range of motion.

Figure 25:
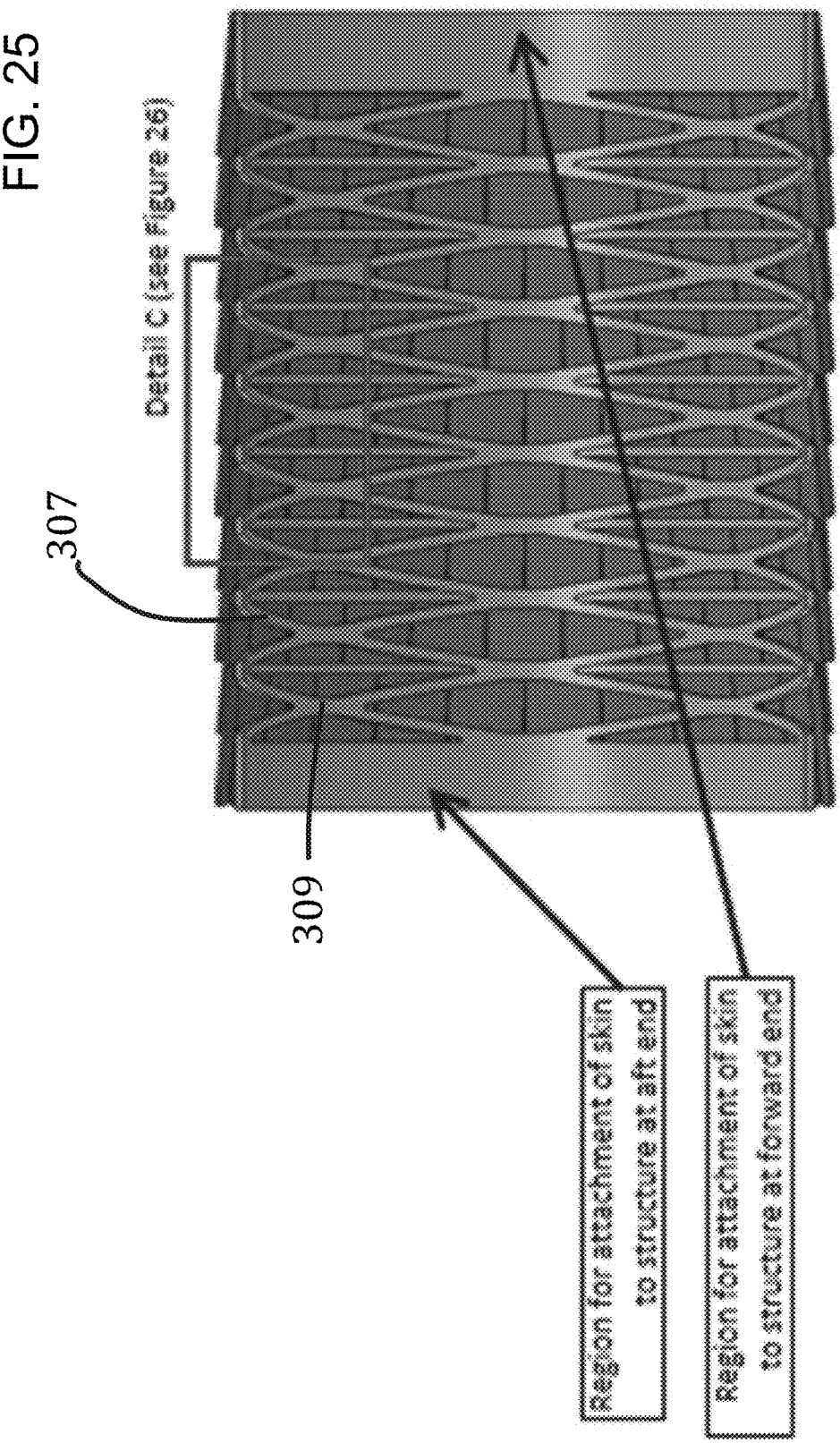
FIG. 25 presents section E-E from FIG. 24 showing an interior view of a plates on reinforcement frame skin.
Figure 26:
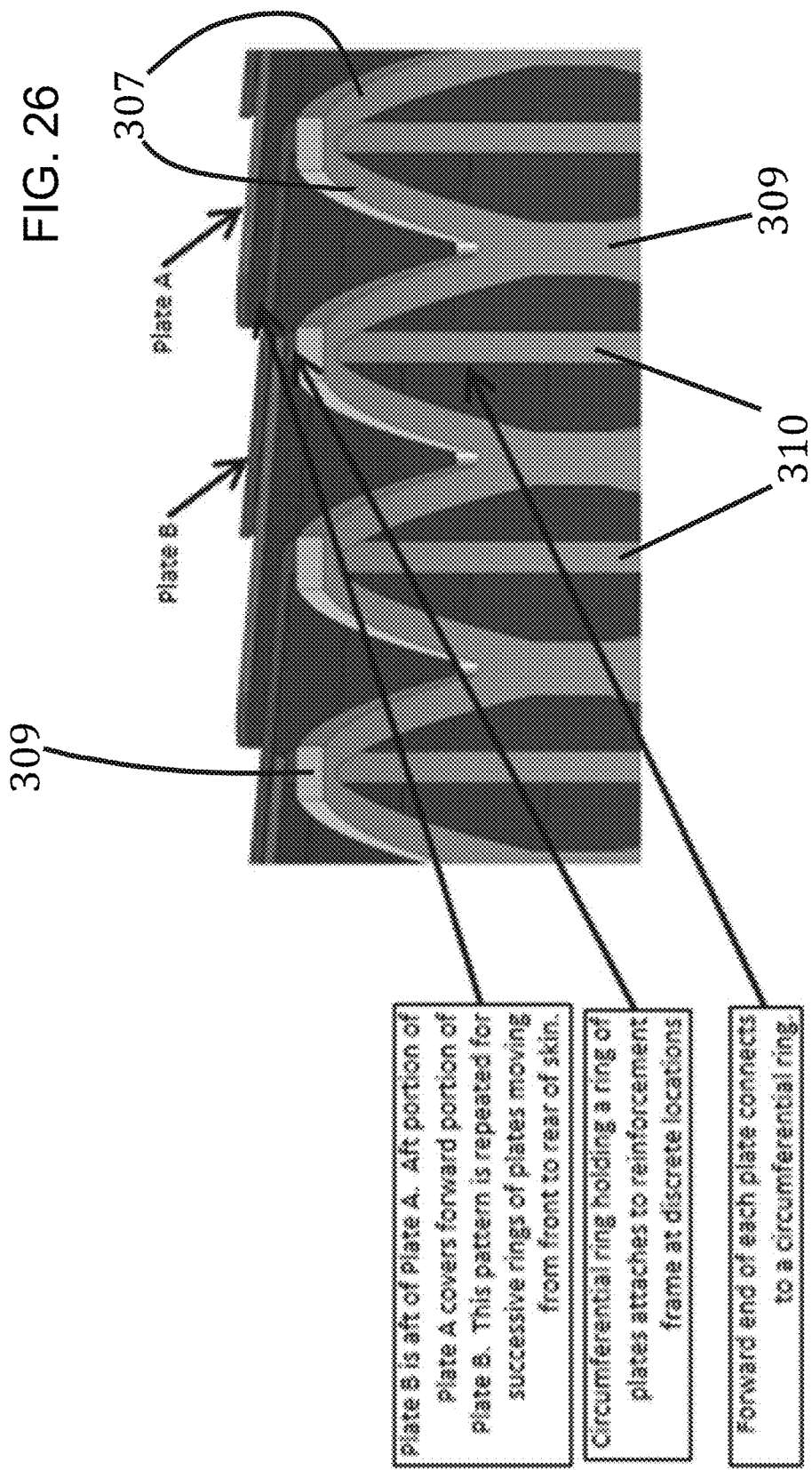
FIG. 26 presents detail C from FIG. 24 illustrating key features of plates on reinforcement frame skin.

FIG. 25 illustrates a sectional view of the embodiment of FIG. 24 along E-E, which reveals the interior of the structure 300. A region at the front 306 and rear 308 of the reinforcement frame 304 provides for attachment to another element or structure. The frame 304 includes helical paths 307, including at least one continuous left-handed helical path and at least one continuous right-handed helical path which form intersections every 90 degrees or less around the circumference of the compliant frame 304. The inset depicted in FIG. 25 (Detail C) is enlarged as FIG. 26. In this view, Plate B is aft of Plate A, and the aft portion of Plate A covers the forward portion of Plate B. This pattern is repeated for successive rings of plates from the rear to the front of the skin. Each circumferential ring 310 of the flexible frame 304 supports and is fixed to a ring of plates 302 at discrete locations. The forward end of each plate 302 is connected to a circumferential ring 310 to form the pattern illustrated in FIG. 24.

Figure 27:
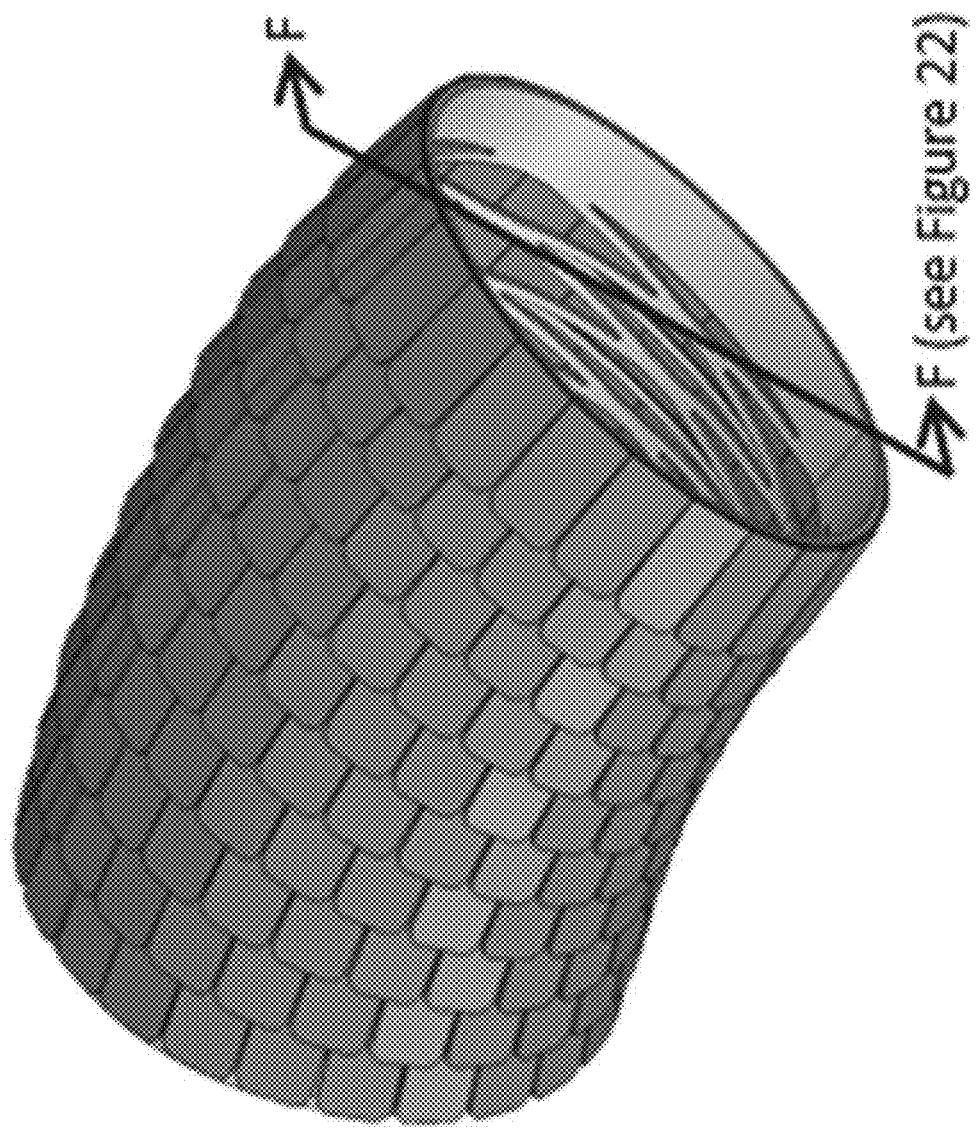
FIG. 27 illustrates a plates on reinforcement frame articulated to 30°.
Figure 28:
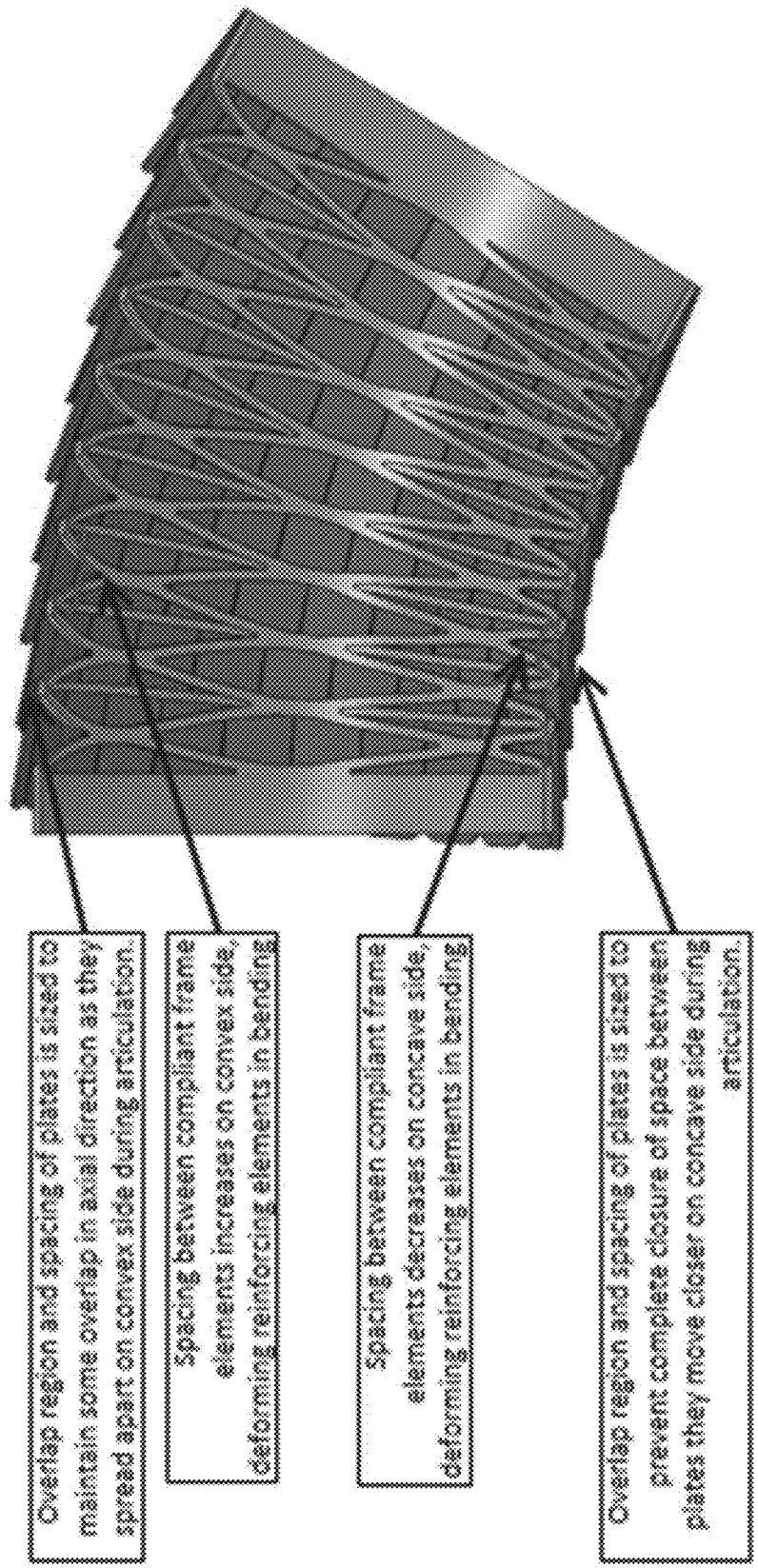
FIG. 28 presents section F-F from FIG. 27 illustrating effects of compression on concave side and tension on convex side of plates on reinforcement frame skin.

FIG. 27 illustrates the 'dragon skin' embodiment 300 articulated to 30 degrees. FIG. 28 illustrates a sectional view of FIG. 27 along F-F to reveal an interior view of the embodiment to illustrate the effects of compression on the concave side 314 and tension on the convex side 312. The overlap region and spacing of the plates is sized to maintain some overlap in the axial direction as the plates 302 spread apart on the convex side 312 during articulation. During articulation, spacing between the compliant, flexible frame elements 316 increases on the convex side 312, deforming the reinforcing elements in bending. Simultaneously, spacing between the compliant, flexible frame elements decreases on the concave side 314, deforming reinforcing elements 316 in bending. The overlap region and spacing of plates 302 is sized to prevent complete closure of the space between plates 302 as they move closer on the concave side 314 during articulation.

Figure 29:
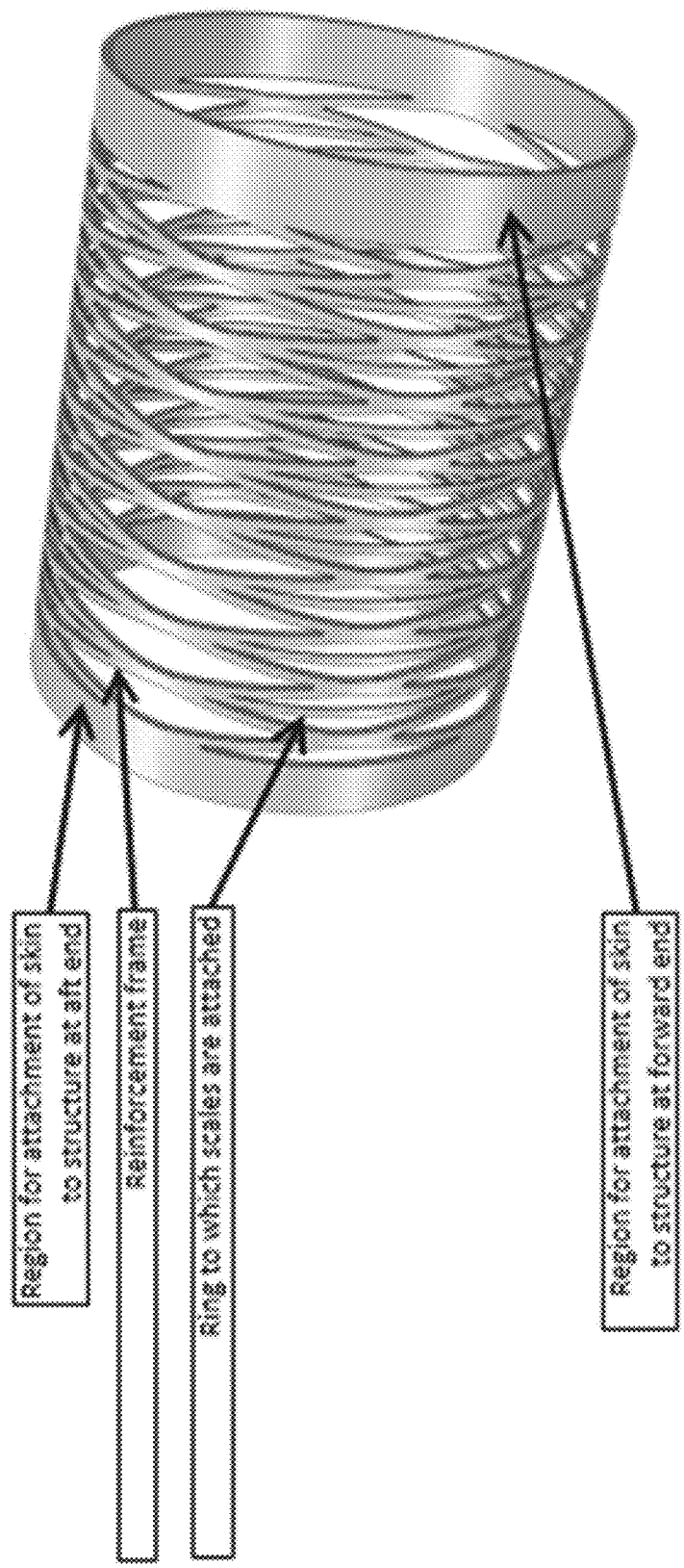
FIG. 29 illustrates a reinforcement frame showing circumferential rings for a plates on reinforcement frame skin to which scales attach.

FIG. 29 illustrates the flexible reinforcement frame 304 for the dragon skin embodiment 300. A region for attachment of the dragon skin structure is provided at the aft end 308 and forward end 306 of the reinforcement frame 304. The reinforcement frame 304 provides a plurality of locations for fixing the scales 302, while simultaneously providing flexibility. The frame 304 includes a plurality of circumferential rings 310 for attachment of the plates 302. The circumferential rings 310 may be spaced so as to provide the desired pitch or spacing of rings of plates 302.

Figure 30B:
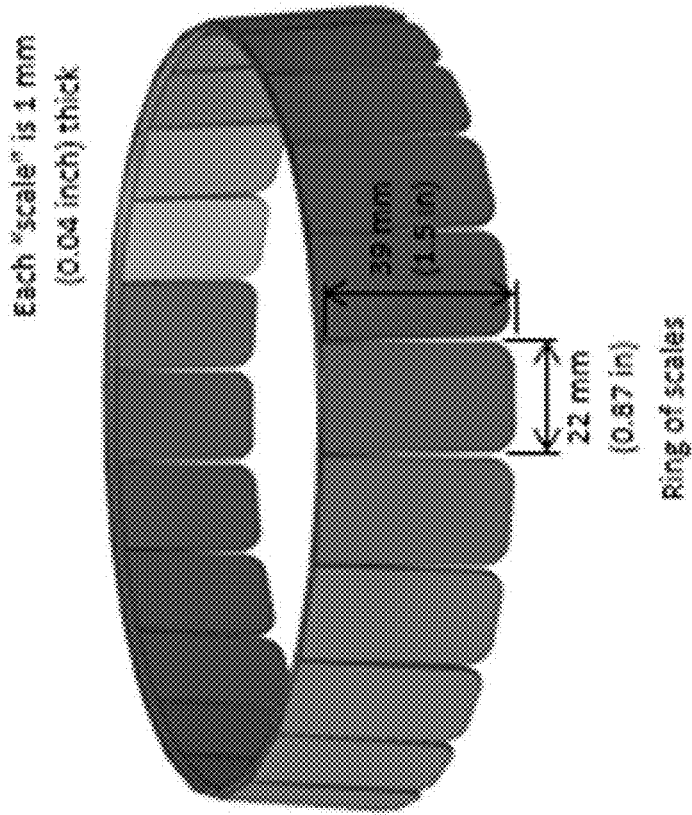
FIGS. 30A-30B present exemplary dimensions of rings and scales for a plates on reinforcement frame skin.
Figure 30A:
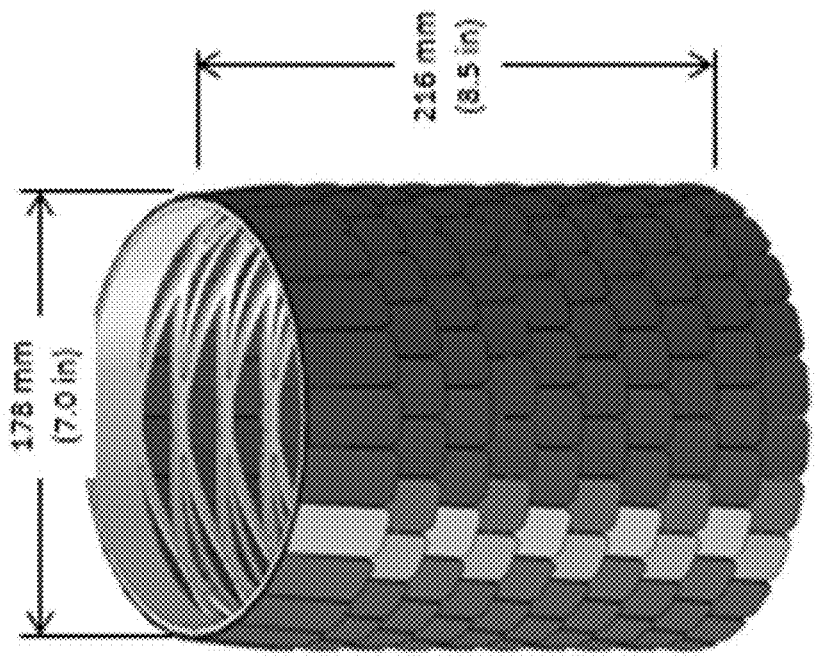

FIGS. 30A-30B present exemplary dimensions of the dragon skin structure and its plates/scales.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

Features disclosed herein may be combined in any desired manner to achieve desired performance goals.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A flexible multi-material structure comprising
    a plurality of overlapping rings that form a generally circular shape perpendicular to a longitudinal axis of the structure;
    an internal compliant hollow frame having a circumference corresponding to the generally circular shape of the plurality of overlapping rings, the internal compliant frame comprising:
        a plurality of connection clips wherein each connection clip is attached one of the plurality of overlapping rings,
        the internal compliant frame and connection clips defining a longitudinal spacing between the plurality of overlapping rings,
        each of the plurality of rings is shaped to minimize contact with adjacent rings when the structure is articulated,
        each ring including a spherical profile along an aft interior region which nests with a forward outer region of an adjacent ring,
        wherein connections between the rings and the compliant frame allows independent motion of the rings and compliant frame, allowing each ring to pivot about a geometric center of the spherical profile.

2. The flexible multi-material structure of claim 1, wherein the compliant frame comprises continuous helical paths to impart torsional rigidity to resist torsion motion.

3. The flexible multi-material structure of claim 2, wherein the continuous helical paths of the compliant frame comprise at least one left-handed helical path and at least one right-handed helical path which form intersections every 90 degrees or less around the circumference of the compliant frame.

4. The flexible multi-material structure of claim 3, wherein the connection clips are fixed to the compliant frame at the intersections in the continuous circumferential paths.

5. A flexible multi-material structure comprising
    a plurality of rings of overlapping plates that form a generally circular shape perpendicular to a longitudinal axis of the structure;
    an internal compliant hollow frame to which the plurality of rings of overlapping plates is attached, the internal compliant hollow frame comprising:
        a circumference corresponding to the generally circular shape of the plurality of rings of overlapping plates;
        at least one continuous left-handed helical path and at least one continuous right-handed helical path which form intersections every 90 degrees or less around the circumference of the compliant frame;
        a plurality of circumferential rings to which a forward edge of each of the plurality of plates are fixed to form uniform rings of plates around the circumference, the circumferential rings passing through the intersections of the right-and left-handed helical paths, the pitch of the left- and right-handed helical paths coinciding with the spacing of circumferential rings of the internal compliant frame and defining intersection spacing that provides overlap between adjacent rows of plates.

6. The flexible multi-material structure of claim 5, wherein each row of plates is offset by half of a plate width, consisting of a set of plates that overlap in the axial direction connected to an internal reinforcing frame that maintains spacing and alignment of the plates.

* * * * *